US005933203A

United States Patent [19]

Wu et al.

[11] Patent Number: 5,933,203

[45] Date of Patent: Aug. 3, 1999

[54] APPARATUS FOR AND METHOD OF DRIVING A CHOLESTERIC LIQUID CRYSTAL FLAT PANEL DISPLAY

[75] Inventors: Bao-Gang Wu; Jianmi Gao, both of Richardson; Meng Zhao, Plano, all of Tex.

[73] Assignee: Advanced Display Systems, Inc., Amarillo, Tex.

[21] Appl. No.: 08/780,315

[22] Filed: Jan. 8, 1997

[51] Int. Cl.[6] .................................................. G02F 1/137

[52] U.S. Cl. ................................ 349/35; 349/33; 349/34; 349/85; 349/168; 349/165; 349/176; 349/177; 349/186; 345/94; 345/95; 345/96; 345/97; 345/209; 345/210

[58] Field of Search ................................ 349/33–35, 85, 349/168, 169, 176, 177, 186; 345/94–97, 209, 210

[56] References Cited

U.S. PATENT DOCUMENTS

| | | | |
|---|---|---|---|
| 3,600,060 | 8/1971 | Kettering et al. | 350/160 |
| 3,620,889 | 11/1971 | Baltzer | 161/5 |
| 3,642,348 | 2/1972 | Wysocki et al. | 350/160 |
| 3,650,603 | 3/1972 | Heilmeier et al. | 350/160 |
| 3,652,148 | 3/1972 | Wysocki et al. | 350/150 |
| 3,654,646 | 4/1972 | McMahon, Jr. | 5/334 C |
| 3,656,909 | 4/1972 | Dixon et al. | 23/253 TP |
| 3,680,950 | 8/1972 | Haas et al. | 350/150 |
| 3,703,331 | 11/1972 | Goldmacher et al. | 350/160 LC |
| 3,704,056 | 11/1972 | Wysocki et al. | 350/150 |
| 3,707,322 | 12/1972 | Wysocki et al. | 350/160 LC |
| 3,711,713 | 1/1973 | Wysocki et al. | 250/83 R |
| 3,718,380 | 2/1973 | Wysocki et al. | 350/160 LC |
| 3,718,382 | 2/1973 | Wysocki et al. | 350/160 LC |
| 3,731,986 | 5/1973 | Fergason | 350/150 |
| 3,776,615 | 12/1973 | Tsukamoto et al. | 350/160 LC |
| 3,784,280 | 1/1974 | Bigelow | 350/150 |
| 3,790,251 | 2/1974 | Wysocki et al. | 350/160 LC |
| 3,806,230 | 4/1974 | Haas | 350/160 LC |

(List continued on next page.)

FOREIGN PATENT DOCUMENTS

| | | | |
|---|---|---|---|
| 0 491 377 | 12/1991 | European Pat. Off. | G09G 3/36 |
| 60086525 | 10/1983 | Japan | G02F 1/133 |
| 8304788 | 11/1996 | Japan . | |
| 9329778 | 12/1997 | Japan . | |
| 10010498 | 1/1998 | Japan . | |
| 10010501 | 1/1998 | Japan . | |
| 10090728 | 4/1998 | Japan . | |

OTHER PUBLICATIONS

G.A. Dir et al., "Cholesteric Liquid Crystal Texture Change Displays," *1971 SID Digest of Technical Papers*, pp. 132–133.

Frederic J. Kahn, "Electric–Field–Induced Color Changes and Pitch Dilation in Cholesteric Liquid Crystals", *Physical Review Letters*, vol. 24(5), Feb. 2, 1970, pp. 209–212.

George H. Heilmeier and Joel E. Goldmacher, "A New Electric–Field Controlled Reflective Optical Storage Effect in Mixed–Liquid Crystal Systems," *Applied Physics Letters*, vol. 13, No. 4, Aug. 15, 1968, pp. 132–133.

W. Haas, J. Adams and J.B. Flannery, "ac–Field Induced Grandjean Plane Texture in Mixtures of Room–Temperature Nematics and Cholesterics," *Physical Review Letters*, vol. 24, No. 11, Mar. 16, 1970, pp. 577–578.

(List continued on next page.)

*Primary Examiner*—William L. Sikes
*Assistant Examiner*—Julie Ngo

[57] ABSTRACT

Driver apparatus and methods of driving at least a portion of a cholesteric liquid crystal ("CLC") panel to a state having a given reflectivity. One of the methods includes the steps of: (1) initially driving the portion to a nematic phase, (2) subsequently driving the portion to a cholesteric phase focal-conic state, the cholesteric phase focal-conic state providing a known reference state for subsequent driving of the portion and (3) thereafter driving the portion to the state having the given reflectivity.

60 Claims, 19 Drawing Sheets

U.S. PATENT DOCUMENTS

| | | | |
|---|---|---|---|
| 3,821,720 | 6/1974 | Greubel tal. | 340/173 LS |
| 3,891,307 | 6/1975 | Tsukamoto et al. | 350/160 LC |
| 3,909,114 | 9/1975 | Haas et al. | 350/160 LC |
| 3,911,421 | 10/1975 | Alt et al. | 340/324 |
| 3,936,815 | 2/1976 | Kogure et al. | 340/324 M |
| 3,947,183 | 3/1976 | Haas et al. | 350/160 LC |
| 3,976,362 | 8/1976 | Kawakami | 350/160 LC |
| 4,005,032 | 1/1977 | Haas et al. | 252/299 |
| 4,011,008 | 3/1977 | Gerritsma et al. | 350/160 |
| 4,068,925 | 1/1978 | Tani et al. | 350/160 LC |
| 4,097,127 | 6/1978 | Haas et al. | 350/332 |
| 4,100,540 | 7/1978 | Fujita et al. | 340/324 M |
| 4,186,395 | 1/1980 | Fujita et al. | 340/765 |
| 4,239,345 | 12/1980 | Berreman et al. | 350/331 R |
| 4,270,846 | 6/1981 | Miyamoto | 350/336 |
| 4,317,115 | 2/1982 | Kawakami et al. | 340/784 |
| 4,405,209 | 9/1983 | Funada et al. | 350/341 |
| 4,408,201 | 10/1983 | Harada | 340/784 |
| 4,413,256 | 11/1983 | Yasuda et al. | 340/784 |
| 4,440,473 | 4/1984 | Sekimoto | 350/342 |
| 4,571,585 | 2/1986 | Stein et al. | 340/784 |
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |
| 4,731,610 | 3/1988 | Baron et al. | 340/784 |
| 4,890,902 | 1/1990 | Doane et al. | 350/347 V |
| 4,994,204 | 2/1991 | Doane et al. | 252/299.01 |
| 5,040,877 | 8/1991 | Blinc et al. | 359/63 |
| 5,093,737 | 3/1992 | Kanbe et al. | 359/56 |
| 5,240,636 | 8/1993 | Doane et al. | 252/299.01 |
| 5,251,048 | 10/1993 | Doane et al. | 359/56 |
| 5,252,954 | 10/1993 | Nagata et al. | 345/95 |
| 5,274,484 | 12/1993 | Mochizuki et al. | 359/55 |
| 5,384,067 | 1/1995 | Doane et al. | 252/299.01 |
| 5,437,811 | 8/1995 | Doane et al. | 252/299.01 |
| 5,453,863 | 9/1995 | West et al. | 359/91 |
| 5,493,430 | 2/1996 | Lu et al. | 359/68 |
| 5,570,216 | 10/1996 | Lu et al. | 359/101 |
| 5,625,477 | 4/1997 | Wu et al. | 349/35 |
| 5,636,044 | 6/1997 | Yuan et al. | 349/142 |
| 5,644,330 | 7/1997 | Catchpole et al. | 345/95 |
| 5,661,533 | 8/1997 | Wu et al. | 349/169 |
| 5,731,861 | 3/1998 | Hatano et al. | 349/169 |
| 5,748,277 | 5/1998 | Huang et al. | 349/169 |

OTHER PUBLICATIONS

W. Haas, J. Adams and G. Dir., "Optical Storage Effects in Liquid Crystals," *Chemical Physics Letters*, vol. 14, No. 1, May 1, 1972, pp. 95–97.

G.A. Dir, J. Adams and W. Haas, "Dynamics of Texture Transitions in Cholesteric–Nematic Mixtures," *Mol. Crystals and Liquid Crystals*, vol. 25, 1974, pp. 19–29.

W. Haas and J. Adams, "Electrophotographic Imaging with Cholesteric Liquid Crystal," *Applied Optics*, vol. 7, Jun., 1968, pp. 1203–1206.

Gary A. Dir et al., "Cholesteric Liquid Crystal Texture Change Displays," *Proceeding of the S.I.D.*, vol. 13/2, Second Quarter 1972, pp. 105–113.

"The Chameleon Chemical", *Life Magazine*, Jan. 12, 1968, pp. 40–46.

Werner E. Haas, James E. Adams, Gary A. Dir and Charles E. Mitchell, "Liquid Crystal Memory Panel," *Proceedings of the S.I.D.*, vol. 14/4, 1973, pp. 121–126.

W. Greubel et al., "Electric–Field Induced Texture Changes in Certain Nematic/Cholesteric Liquid Crystal Mixtures," *Molecular Crystals and Liquid Crystals*, vol. 24, 1973, pp. 103–111.

J.J. Wysocki et al., "Electric–Field Induced Phase Change in Cholesteric Liquid Crystals," *Physical Review Letters*, vol. 20, No. 19, May 6, 1968, pp. 1024–1025.

Hans Kelker and Rolf Hatz, *Handbook of Liquid Crystals*, 1980.

J. Wysocki, J. Adams and W. Haas, "Electric–Field Induced Phase Change in Cholesteric Liquid Crystals," *Molecular Crystals and Liquid Crystals*, vol. 8, 1969, pp. 471–487.

G. Paul Montgomery, Jr., "Polymer–dispersed Liquid Crystal Films for Light Control Applications," *Proc. SPIE*, vol. 1080, 1989, pp. 242–249.

D.–K. Yang and J.W. Doane, "Cholesteric Liquid Crystal/Polymer–Gel Dispersions: Reflective Display Applications," *SID 92 Digest*, pp. 759–761.

Werner E. Haas, "Liquid Crystal Display Research: The First Fifteen Years," *Mol. Crystals and Liquid Crystals*, vol. 94, 1983, pp. 1–31.

J.E. Adams et al., "Optical Properties of Certain Liquid Crystal Films," *The Journal of Chemical Physics*, vol. 50, No. 6, Mar. 15, 1969, pp. 2458–2464.

J. Adams, W. Haas and J. Wysocki, "Light Scattering Properties of Cholesteric Liquid Crystal Films," *Molecular Crystals and Liquid Crystals*, vol. 8, 1969, pp. 9–18.

W. Haas et al., "Imagewise Deformation and Color Change of Liquid Crystals in Electric Fields," *Applied Optics, Supplement 3: Electrophotography*, 1969, pp. 196–198.

Catalogue Sheet for Product Information on Liquid Crystal Materials, BDH Chemical Ltd., 1 p.

Frederic J. Kahn et al., "Surface–Procuded Alignment of Liquid Crystals," *Proceedings of the IEEE*, vol. 61, No. 7, Jul. 1973, pp. 823–828.

E. Stepke, "Liquid Crystals: Perspectives, Prospects and Products," *Electro–Optical Systems Design*, Feb. 1972, pp. 20–31.

D.–K. Yang et al., "Cholesteric Liquid Crystal/Polymer Gel Dispersion Bistable at Zero Field," *Conference Record of the 1991 International Display Research Conference*, Oct. 15–17, 1991, pp. 49–52.

Werner Haas and James Adams, "Electric Field Effects on the System Oleyl Cholesteryl Carbonate–Cholesteryl Chloride," *Journal of the Electrochemical Society*, vol. 118, No. 8, Aug. 1971, pp. 1372–1373.

J.W. Doane, D.–K. Yang, and L.C. Chien, "Current Trends in Polymer Dispersed Liquid Crystals," *International Display Research Conference*, Oct. 15–17, 1991, Conference Record pp. 175–178.

D.–K. Yang, L.–C. Chien and J.W. Doane, "Cholesteric Liquid Crystal/Polymer Dispersion for Haze Free Shutters," *Applied Physics Letters 60*, Jun. 22, 1992, pp. 3102–3104.

J.W. Doane, D.–K. Yang and Z. Yaniv, "Front–Lit Flat Panel Display from Polymer Stabilized Cholesteric Textures," *Japan Display 92*, Oct. 12–14, 1992, abstract S3–6, Conference Record, pp. 73–76.

Y.K. Fung, D.K. Yang, J.W. Doane and Z. Yaniv, "Projection Display from Polymer Stabilized Cholesteric Textures," *The 13th International Display Research Conference*, Aug. 31–Sep. 3, 1993, Strasbourg–France, Abstract LCT–8, Conference Record, pp. 157–160.

D.–K. Yang, J.L. West, L.–C. Chien and J.W. Doane, "Control of Reflectivity and Bistability in Displays Using Cholesteric Liquid Crystals," *Journal of Applied Physics*, Jul. 15, 1994, pp. 1331–1333.

P.G. de Gennes and J. Prost, *The Physics of Liquid Crystals*, Clarendon Press, Oxford, 1974(1st ed.) and 1993 (2nd ed.), pp. 214–241.

J.William Doane and Michael E. Stefanov, "Reflective Cholesteric Liquid–Crystal Displays," *SID, Information Display*, 12/96, pp. 18–21.

M. Pfeigger, Y. Sun, D.–K. Yang, J.W. Doane, W. Sautter, V. Hochholzer, E. Ginter, E. Lueder and Z. Yaniv, "Design of PSCT Materials for MIM Addressing," *Society for Information Display International Symposium Digest of Technical Paper*, vol. XXV, Jun. 14–16, 1994, pp. 837–840.

J.W. Doane, W.D. St. John, "Invited Relfective Cholesteric Displays," *Proceedings of the 15th International Display Research Conference*, Oct. 16–18, 1995, pp. 47–50.

J.W. Doane, W.D. St. John, Z.J. Lu and D.K. Yang, "Stabilized and Modified Cholesteric Liquid Crystals for Reflective Displays," *Conference Record of the 1994 International Display Research Conference*, Oct. 10–13, 1994, pp. 65–68.

J.W. Doane, "Light Modulating material Comprising a Liquid Crystal Dispersion in a Synthetic Resin Matrix", PCT Application No. PCT/US85/00397, filed Aug. 4, 1985.

J.W. Doane, et al., "Gene Detection System", PCT Application No. PCT/US93/09999, filed Oct. 19, 1993.

D.K. Kang and J.W. Doane, "Cholesteric Reflective Display: Drive Scheme and Contrast," Applied Physics Letters, Apr. 11, 1994, pp. 1905–1907.

C. Tani, F. Ogawa, S. Naemura, T. Ueno and F. Saito, "Storage–Type Liquid–Crystal Matrix Display," Proceesings of the SID, vol. 21/2, 1980, pp. 71–76; and.

Akihiro Mochizuki, Toshaiki Yoshihara, Masayuki Iwasaki, Yasuo Yamagishi, Yoshio Koike, Munehiro Haraguchi and Yoshiya Kaneko, "A 1120×768 Pixel Four–Color Double–layer Liquid–Crystal Projection Display," Proceedings of the Society for Information Display, vol. 31, No. 2, 1990, pp. 155–161.

Chizuka Tani, Fumihiro Ogawa, Shohei Naemura, Toshihiko Ueno and Fujio Saito, "Storage–Type Liquid Crystal Matrix Display," SID 79 Digest, pp. 114–115.

A. Mochizuki, H. Gondo, T. Watanuki, K. Saito, K. Ikegami, H. Okuyama, "Nematic–Cholesteric LCD Using Hysteresis Behavior," SID 85 Digest, pp. 135–138.

APPARATUS FOR AND METHOD OF DRIVING A CHOLESTERIC LIQUID CRYSTAL FLAT PANEL DISPLAY

TECHNICAL FIELD OF THE INVENTION

The present invention is directed, in general, to liquid crystal displays and, more specifically, to an apparatus for and method of driving a cholesteric liquid crystal ("CLC") flat panel display.

BACKGROUND OF THE INVENTION

The development of improved liquid crystal ("LC") flat-panel displays is an area of very active research, driven in large part by the proliferation of and demand for portable electronic appliances, including computers and wireless telecommunications devices. Moreover, as the quality of LC displays improves, and the cost of manufacturing declines, it is projected that LC displays may eventually displace conventional display technologies, such as cathode-ray-tubes.

Cholesteric liquid crystal ("CLC") technology is a particularly-attractive candidate for many display applications. Cholesteric liquid crystals may be used to provide bi-stable and multi-stable displays that, due to their non-volatile "memory" characteristic, do not require a continuous driving circuit to maintain a display image, thereby significantly reducing power consumption. Moreover, some CLC displays may be easily viewed in ambient light without the need for back-lighting. The elimination of the need for back-lighting is particularly significant in that lighting requirements typically represent about 90% of the total power consumption of conventional LC displays.

One aspect of the quality of CLC displays to which significant research has been directed in recent years is the demand for such displays to display full-motion video. It is quite possible that CLC displays capable of displaying full-motion video will eventually displace conventional cathode-ray tubes in television and computer display applications. Several characteristics of conventional CLC materials and driving circuits, however, present limitations to achieving CLC displays that can be driven fast enough to support the frame rates necessary to display full-motion video.

CLC displays are constructed by trapping a thin film of liquid crystal between two substrates of glass or transparent plastic. The substrates are usually manufactured with transparent electrodes, typically made of indium tin oxide ("ITO"), to which electrical "driving" signals are coupled. The driving signals induce an electric field which can cause a phase change or state change in the CLC material; the CLC exhibiting different light-reflecting characteristics according to its phase and/or state.

CLCs can exhibit a field-induced "nematic" phase and a stable "cholesteric" phase. The field-induced "nematic" phase of a conventional CLC is a "non-stable" state, meaning that the CLC will not remain in that state if the electric field necessary to drive the CLC into the nematic phase is removed; i.e. upon removal of the electrical field, the CLC will transform to a "stable" cholesteric phase. Thus, to reduce display power requirements, conventional CLC displays are generally operated only in the stable cholesteric phase in which two different molecular domain structures (planar and focal-conic), or states, of the CLC are used to modulate incident light. When a CLC in the planar state is illuminated with ambient light, the CLC reflects light that is within an intrinsic spectral bandwidth centered about a wavelength $\lambda_0$; all other wavelengths of incident light are transmitted through the CLC. The wavelength $\lambda_0$ may be within the invisible or visible ("color") light spectrum; a CLC having an intrinsic wavelength in the infra-red spectrum being particularly useful in transmissive mode displays where the reflection of color to an observer is not desired or necessary. By varying the proportion of chiral compound present in the CLC, this selective reflection can be achieved for any wavelength $\lambda_0$ within the infra-red and color spectrums. When the CLC is in the focal-conic state, the CLC optically scatters all wavelengths of incident light; a substantial portion of the incident light being forward-scattered and a lesser portion being back-scattered.

The structure and operation of CLCs is not fully understood; empirical data, however, has provided a basis for different hypothetical models that can be used to characterize the response of a CLC to controlled stimuli. The principles of the present invention, however, are not limited by the model used herein to describe the structure and response of a CLC. As used hereinafter, "on" and "off" refer to the relative states of local domains within the CLC. Each pixel of a CLC may be composed of domains in a planar ("on") or focal-conic ("off") state, or "texture;" the planar state corresponding to a maximum level of reflectivity and the focal-conic state corresponding to a minimum level of reflectivity. Furthermore, a multi-stable CLC is capable of displaying "gray scale" images, wherein each display pixel can be driven to a desired gray scale level by selectively driving the local domains to any one of multiple stable intermediate states between the planar and focal-conic states; each intermediate state having a level of reflectivity between those of the planar and focal-conic states.

A driving signal can be selectively applied to a CLC to switch between the cholesteric-phase focal-conic and planar states. An important characteristic of CLC materials in display applications is that the cholesteric-phase planar and focal-conic states are stable states; i.e. the state of the CLC does not change when the driving signal is removed. This characteristic of CLCs is generally referred to as "bi-stability" for two state (e.g. black and white) displays, and "multi-stability" for multi-state (e.g. "grey scale") displays. The stability, or "memory," characteristic of CLCs eliminates the need to continually refresh the display as is required by other LC materials and cathode-ray tubes, thereby reducing power consumption. For full-motion video applications, however, a CLC display must be driven at a rate sufficient to display smooth transitions between video frames, referred to as the video "frame rate."

Two approaches may be taken to increase the frame rate of conventional CLC displays. One approach, disclosed by Bao-Gang Wu, et al. in copending U.S. patent application Ser. No. 08/445,181, filed on May 19, 1995 now U.S. Pat. No. 5,661,533 (commonly assigned with the present application), incorporated herein by reference, is to improve the state transition characteristics of the CLC material by modifying the texture of the material. A second approach is to improve the method by which electrical drive signals are used to control the state transitions of the CLC.

U.S. Pat. No. 5,453,863, issued to West, et al. on Sep. 26, 1995, discloses the use of signals of varying electrical magnitudes to transform the CLC from focal-conic to planar states, and vice versa; a continuum of signal magnitudes being used to drive the CLC to intermediate "gray scale" states. As hereinafter described, the portion of a typical CLC electro-optical response curve corresponding to the intermediate (i.e. gray scale) states has a steep slope; i.e. the portion of the curve corresponds to a narrow voltage range over which signals of varying electrical magnitudes can be used to drive a CLC to different intermediate states. Because the voltage range is typically narrow, a principal disadvantage of the method disclosed by West, et al. is that it is difficult to precisely drive the CLC to a preferred intermediate state. Furthermore, the electro-optical response curve of a CLC will shift to the left or right with variations in the cell gap (i.e. the thickness of the CLC). Because the portion of a typical CLC electro-optical response curve corresponding to the intermediate (i.e. gray scale) states has a steep slope, even a slight shift in the curve will cause a particular drive voltage to produce different intermediate states in pixels having slightly different cell gaps.

Therefore, what is needed in the art is an apparatus for and method of driving a CLC flat panel display at full-motion video frame rates. Furthermore, there is a need in the art for an apparatus and method of driving a CLC flat panel display to intermediate (gray scale) states, wherein the intermediate states are not a function of a drive signal voltage.

SUMMARY OF THE INVENTION

To address the above-discussed deficiencies of the prior art, it is a primary object of the present invention to provide a driver apparatus and methods of driving at least a portion of a cholesteric liquid crystal ("CLC") panel to a state having a given reflectivity, the apparatus and methods of driving suitable to drive a CLC display at full-motion video frame rates.

In the attainment of the above-described primary object, the present invention recognizes that a matrix CLC display may be driven faster when it is reset to a cholesteric phase focal-conic state prior to being driven to a final state of given reflectivity. The present invention initializes, or "resets," the one or more portions of a CLC display by initially driving the one or more portions to the nematic phase and subsequently driving the one or more portions to the cholesteric phase focal-conic state. In a conventional matrix display, the one or more portions correspond to the picture elements, or "pixels," of the matrix display. The cholesteric phase focal-conic state has known characteristics and, therefore, can be used to provide a known reference state for the subsequent driving of the portion to the desired state having the given reflectivity.

In one embodiment of the present invention, the step of initially driving comprises the step of applying a sequence of pulses to drive the portion to the nematic phase, and the step of subsequently driving comprises the step of applying a sequence of pulses to drive the portion to the cholesteric phase focal-conic state. As described hereinafter, initially driving the portion to the nematic phase and subsequently to the cholesteric phase focal-conic state has the advantage of increasing the speed at which the display can be driven, as well as improving the quality of a display image.

In one embodiment of the present invention, the step of initially driving comprises the step of applying a first sequence of pulses having a first amplitude to drive the portion to the nematic phase and the step of subsequently driving comprises the step of applying a second sequence of pulses having a second amplitude to drive the portion to the cholesteric phase focal-conic state. The steps of applying the first and second sequence of pulses are referred to as an "initialization" stage, which erases the previous state of the portion in preparation for driving the portion to a new state in an "addressing" stage. In related embodiments, the first and second amplitudes are a function of a composition of CLC in the CLC panel and/or a function of a thickness of the CLC panel. The apparatus for and method of driving a CLC disclosed by the present invention is not limited to a particular CLC composition or CLC panel structure; the principles disclosed herein may be employed to advantage in many different CLC flat panel display structures using different CLC materials.

Following the selective initialization of portions of the CLC display, a portion of the display can be "addressed" by thereafter driving the state of the portion to a desired final state having a given reflectivity. In one embodiment of the present invention, the step of thereafter driving includes the step of applying an addressing pulse, or sequence of pulses, having a predetermined amplitude to drive the portion from the cholesteric phase focal-conic state to a cholesteric phase planar state. In a related embodiment, the desired state having a given reflectivity is an intermediate state between the cholesteric phase focal-conic state and a cholesteric phase planar state, and the step of thereafter driving includes the step of applying a sequence of addressing pulses having a predetermined amplitude to drive the portion from the cholesteric phase focal-conic state to the intermediate state, the given reflectivity being a function of a duration of the sequence of addressing pulses. In another embodiment, the step of applying a sequence of addressing pulses having a predetermined amplitude is preceded by the step of applying a first sequence of pulses having an amplitude less than a minimum amplitude necessary to drive the CLC from the focal-conic state, a duration of the first sequence of pulses adjusted such that the sum of the duration of the first sequence of pulses and the duration of the sequence of addressing pulses equals a predetermined value.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 1-B illustrates a schematic representation of a CLC domain;

FIG. 7-B illustrates an exemplary electro-optical response characteristic of a CLC for a driving pulse having a pulse duration of 3 ms;

FIG. 7-C illustrates an exemplary electro-optical response characteristic of a CLC for a driving pulse having a pulse duration of 1 ms;

FIG. 7-D illustrates an exemplary electro-optical response characteristic of a CLC for a driving pulse having a pulse duration of 70 $\mu$s;

FIG. 9-B illustrates an exemplary second pulse sequence of an initialization waveform for a CLC driving apparatus and method according to the principles of the present invention;

FIG. 16-B illustrates the effect of temperature on the required driving time, according to the principles of the present invention, for an exemplary CLC.

DETAILED DESCRIPTION

Figure 1A:
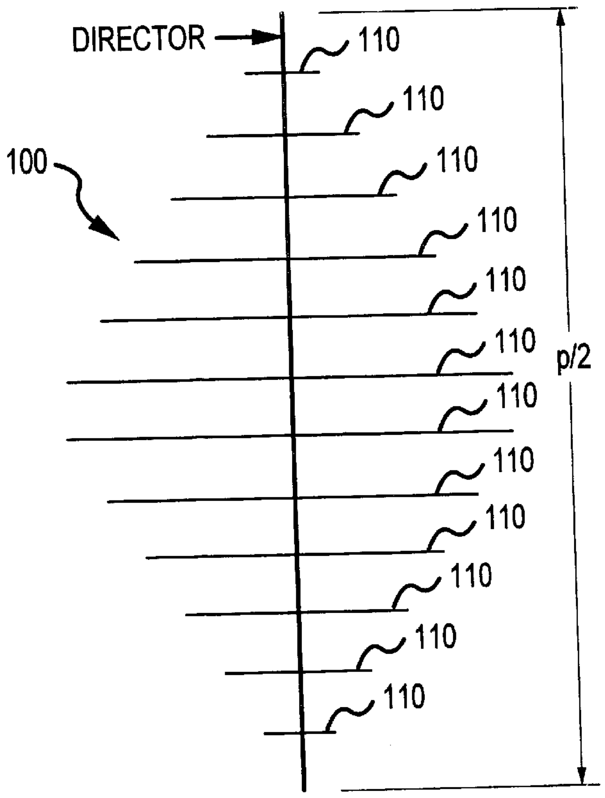
FIG. 1-A illustrates a schematic representation of the helical twisted structure of a cholesteric liquid crystal ("CLC") molecule.
Figure 1B:
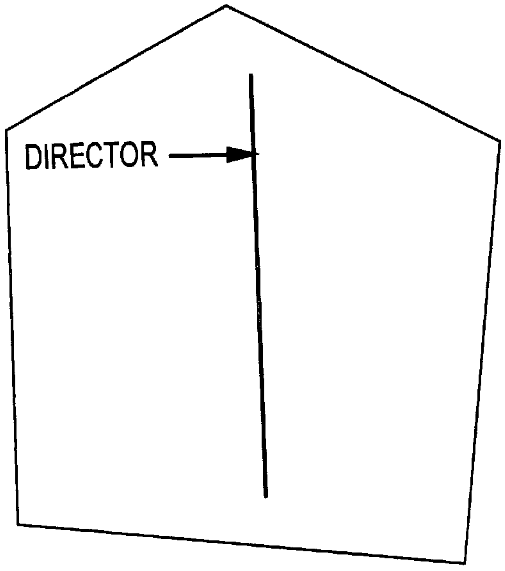

Before describing the novel apparatus for and method of driving a cholesteric liquid crystal ("CLC") flat panel display disclosed by the present invention, a description of the various structures of CLC materials is necessary to appreciate the advantages of the present invention. Referring initially to FIG. 1-A, illustrated is a schematic representation of the helical twisted structure of a CLC 100. A CLC helical structure 100 consists of molecular directors 110 that interact to produce a helical twisted structure having a pitch p; the pitch p is predetermined by the amount of chiral material added to the CLC material. In FIG. 1-A, the molecular directors 110 are shown as two-dimensional projections for each hypothetical layer; the different projected lengths of the directors illustrating the twisted structure of the CLC helical structure 100. A volume of CLC material consists of many CLC helical structures 100 arranged in "domains." FIG. 1-B illustrates a schematic representation of a CLC domain. The helical axis of the CLC helical structure 100 is called the "domain director." A CLC matrix flat panel display includes many picture elements, or "pixels," each of which contain many CLC domains.

A CLC can be forced to change its structure by applying an electric field. Under the force of the applied electrical field, the domain directors are reoriented, resulting in various light-reflecting and light-scattering states. The light-reflecting planar state can exhibit a bright color and the light-scattering focal-conic state can exhibit a substantially black color, as hereinafter described. If the CLC display includes a plurality of separately-addressable pixels, the CLC display can be used to display text and/or images.

Figure 2:
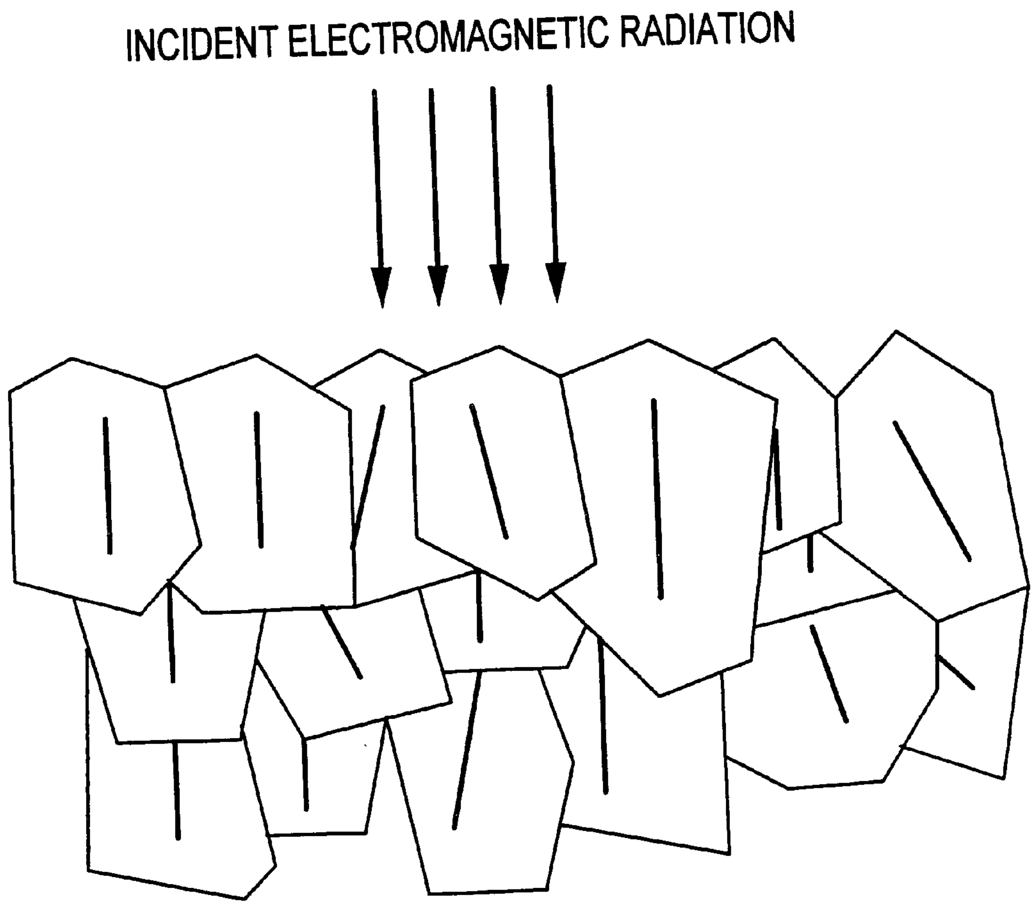
FIG. 2 illustrates a schematic representation of a CLC domain in a predominantly planar state.

An important characteristic of CLCs is the existence of stable states even when no driving signal is applied; i.e. "zero field" conditions. A CLC can exhibit a stable light-reflective planar state, a stable light-scattering focal-conic state, and many stable intermediate (i.e. gray scale) states between the planar and focal-conic states. FIG. 2 illustrates a schematic representation of a CLC domain in a predominantly planar state. In the planar state, the CLC molecules are arranged in hypothetical layers with the long axes of the molecules in each layer substantially parallel to each other (and the display substrates); the director of the domains thus being substantially perpendicular to the layers. The periodicity of the planar state selectively reflects electromagnetic radiation (e.g. ambient light) that is perpendicularly incident on these layers. The center wavelength of the selective radiation band is given by $\lambda$=np, where $\lambda$ is the wavelength of the radiation, n is the average refractive index of liquid crystal and p is the predetermined pitch of the CLC material. In the planar state, the CLC exhibits a bright state having an intrinsic color having a wavelength substantially equal to $\lambda$, which can be changed by varying the amount of chiral material in the CLC.

Figure 3:
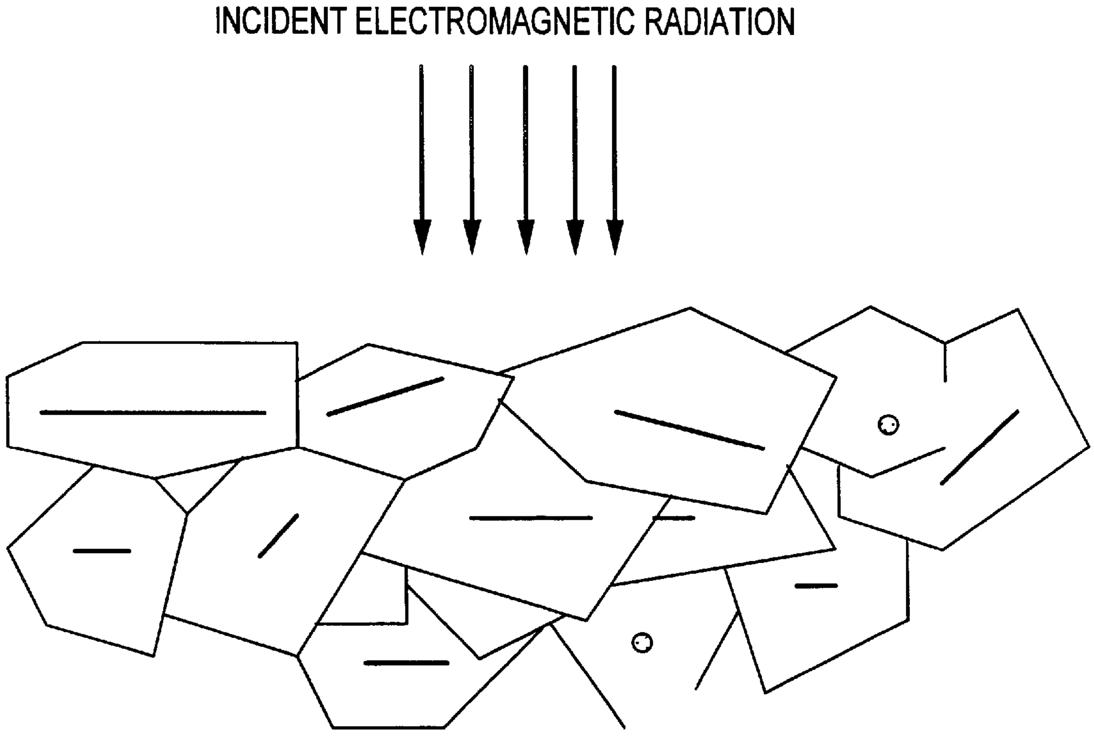
FIG. 3 illustrates a schematic representation of a CLC domain in a predominantly focal-conic state.

Turning now to FIG. 3, illustrated is a schematic representation of a CLC domain in a predominantly focal-conic state. In the focal-conic state, the director of each CLC domain is substantially parallel to the display substrates and randomly oriented with respect to the directors of other CLC domains. The randomly-oriented directors causes a scattering of all wavelengths of the incident light. If the thickness of the CLC is thin enough (e.g., less than 5 $\mu$m), only a very small percentage of the incident radiation is reflected, or "back-scattered;" the remainder being transmitted, or "forward-scattered." If the CLC panel includes a back plate that absorbs the transmitted radiation, then the portion of the panel in the focal-conic state will appear substantially "black" to an observer.

Figure 4:
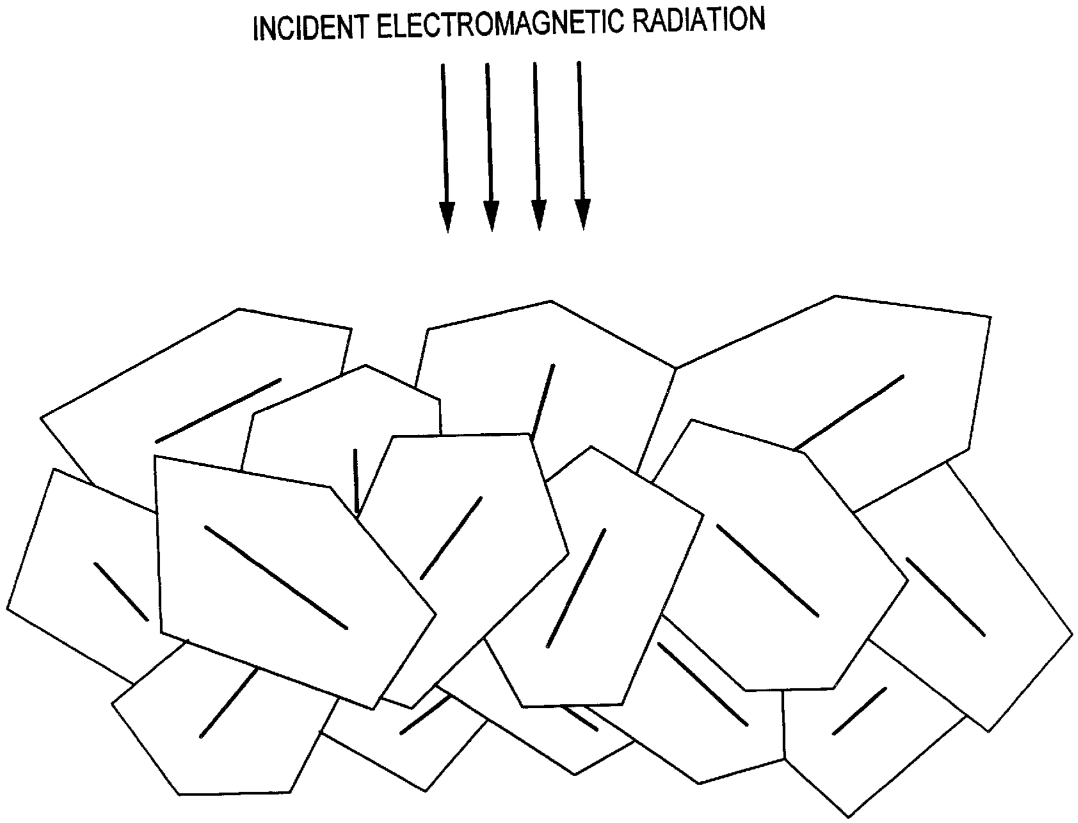
FIG. 4 illustrates a schematic representation of a CLC domain in an intermediate ("gray scale") state between a predominantly planar state and a predominantly focal-conic state.

Turning now to FIG. 4, illustrated is a schematic representation of a CLC domain in an intermediate ("gray scale") state between a predominantly planar state and a predominantly focal-conic state. Because the director of each local domain in a display pixel may not be substantially perpendicular or parallel to the display substrates, as described supra for the predominantly planar and focal-conic states, respectively, each pixel can be driven to a state that exhibits a light-reflectivity level intermediate between the predominantly planar and predominantly focal-conic states; the average angle of the directors of the local domains, relative to the display substrates, determining the light-reflection intensity (i.e. intermediate state) of the CLC pixel. For example, if a substantial portion of the local domains are in the planar state, the pixel appearance will correspond to one extreme of the gray scale; if a substantial portion of the local domains are in the focal-conic state, the pixel appearance will correspond to the other extreme of the gray scale; each intermediate gray scale level corresponding to a relative proportion of local domains having a particular average angle.

Figure 5:
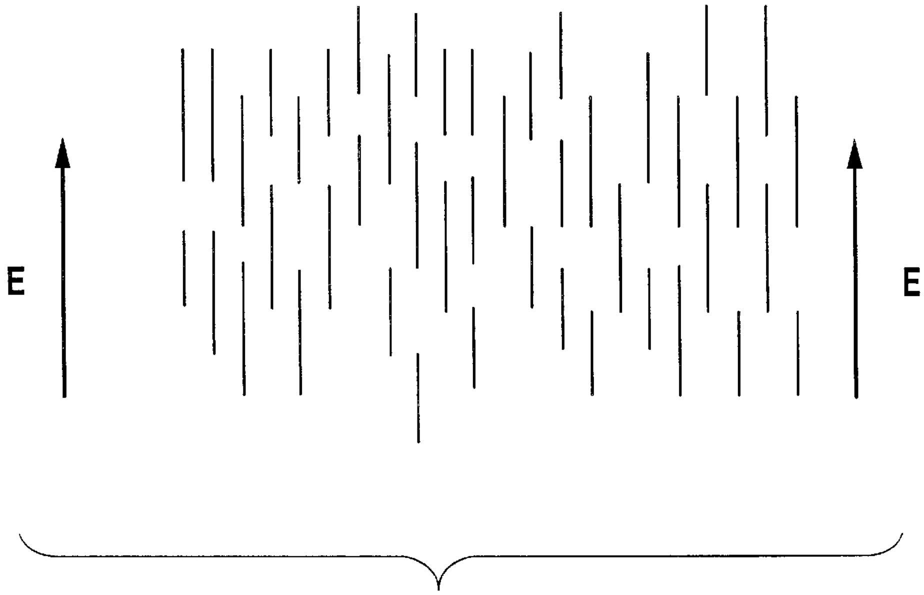
FIG. 5 illustrates a schematic representation of a CLC in a field-induced nematic phase.

Another important structure of CLCs is the "field induced" nematic phase. FIG. 5 illustrates a schematic representation of a CLC in a field-induced nematic phase. "Field induced" means that the a driving signal must be continually applied to the CLC to maintain the nematic phase; thus, the nematic phase is not a stable state. If a strong electric field is applied to the CLC, the CLC transitions to a nematic phase, regardless of whether the initial state of the CLC was the planar or focal-conic state. When the strong electric field is removed, the CLC will reform to a cholesteric phase planar or focal-conic. If the electric field is removed relatively fast, the CLC will transition to the light-reflective planar state. If the electric field is not reduced to zero immediately (e.g., the strong electric field is followed by a lower electric field), however, the CLC will transition to the light-scattering focal-conic state.

Figure 6:
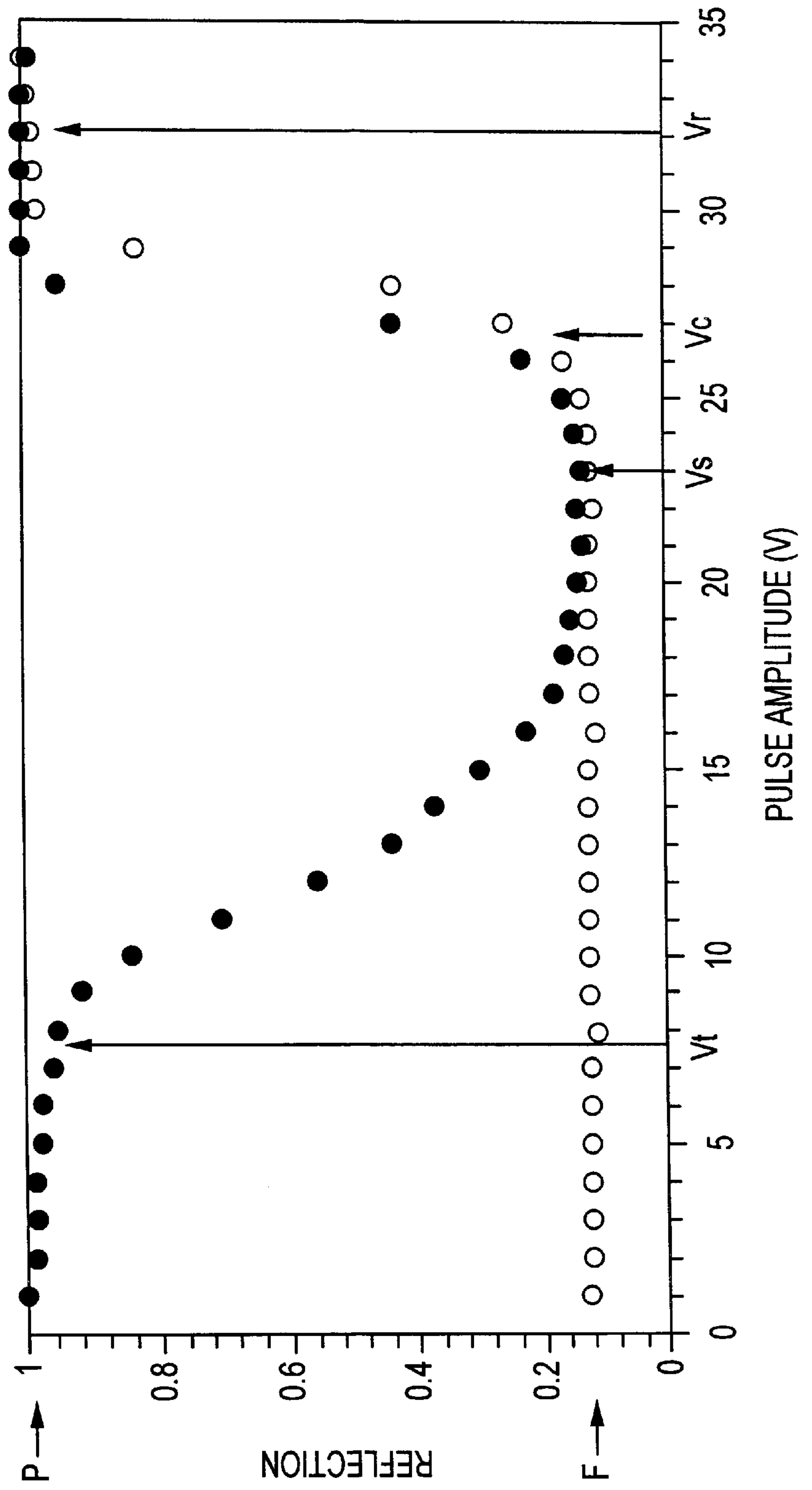
FIG. 6 illustrates an exemplary electro-optical response characteristic of a CLC.
Figure 7A:
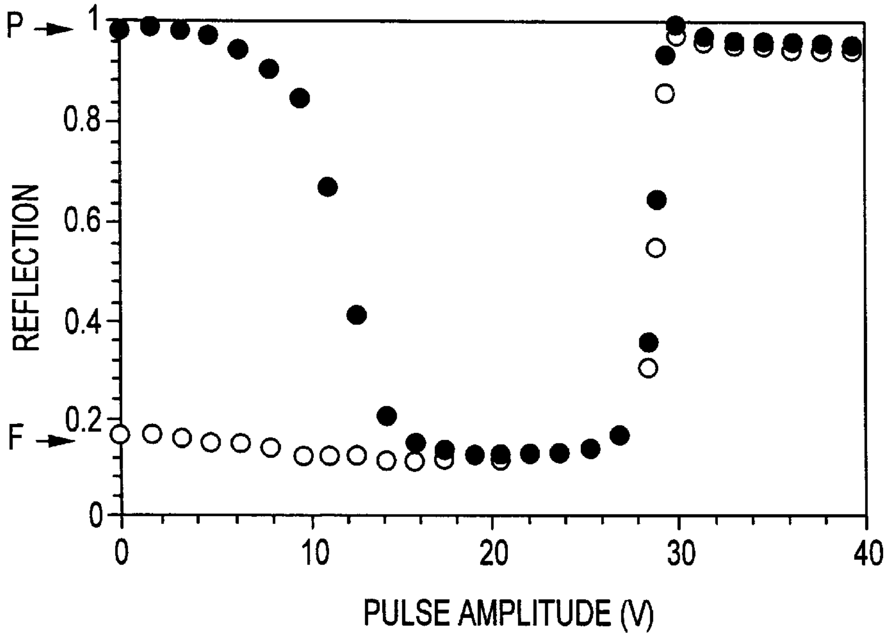
FIG. 7-A illustrates an exemplary electro-optical response characteristic of a CLC for a driving pulse having a pulse duration of 50 ms.
Figure 7B:
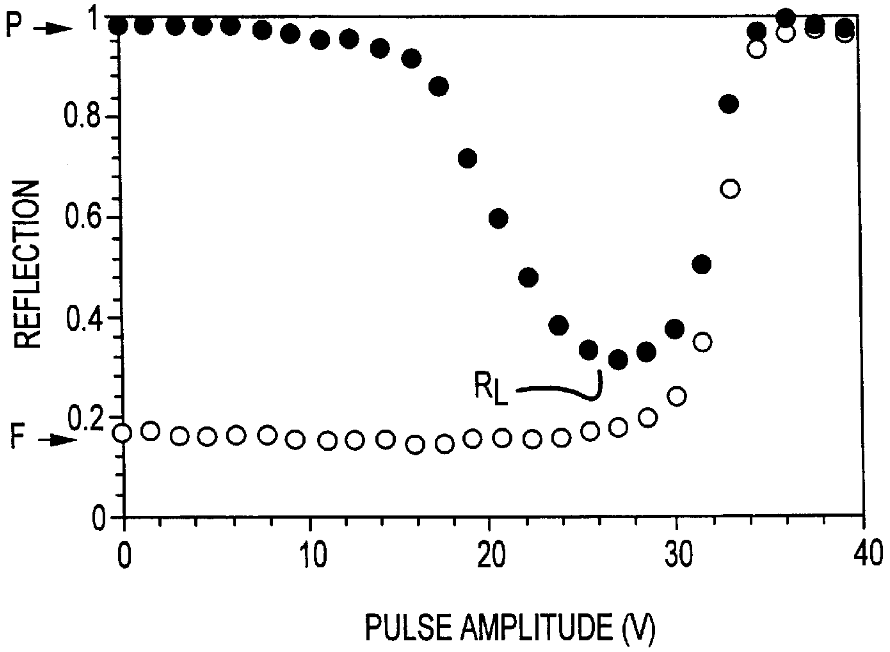
Figure 7C:
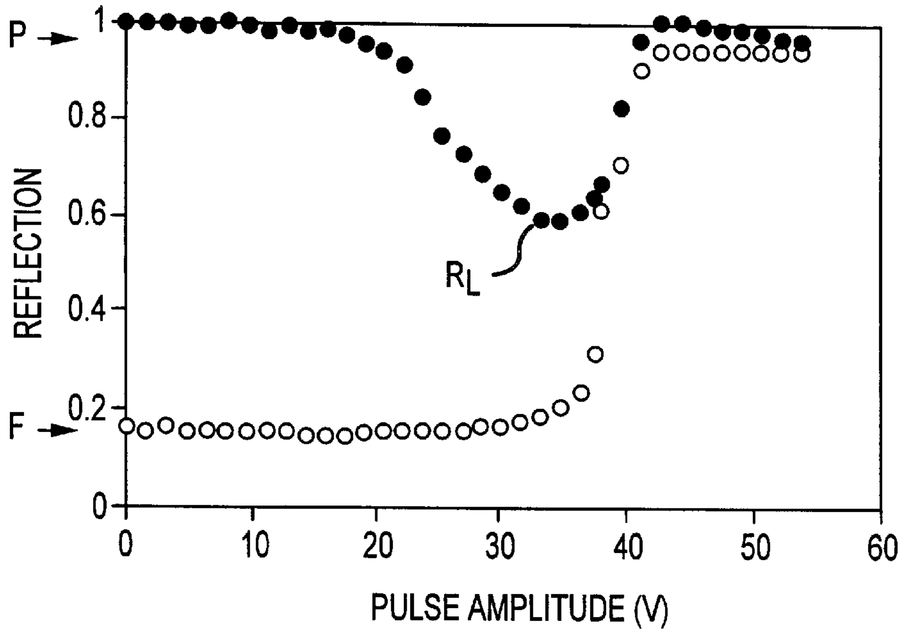
Figure 7D:
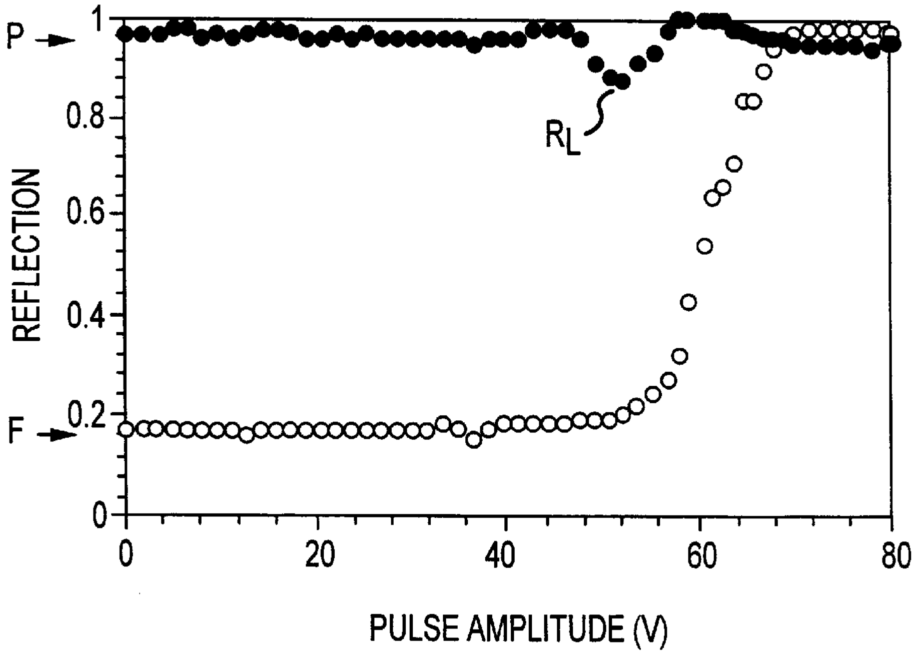

Turning now to FIG. 6, illustrated is an exemplary electro-optical response characteristic of a CLC. The experimental data illustrated in FIG. 6 confirm the existence of zero-field stable states of a conventional CLC driven to various levels of reflectivity by a single voltage pulse having a fixed duration; the reflectivity of the CLC plotted as a function of the magnitude of the voltage pulse employed. The reflection measurements were made under zero-field conditions; i.e. the measurements were taken after the driving pulse was removed. The scale of reflectivity illustrated is an arbitrary scale of reflectance values normalized to a maximum level of reflectivity. The solid circles represent the reflectivity of the CLC, following application of various driving pulses having voltages as shown, for a CLC initially in a predominantly light-reflecting planar state; i.e. initial reflectivity equal to approximately 1. The empty circles represent the reflectivity of the CLC, following application of various driving pulses having voltages as shown, for a CLC initially in a predominantly light-scattering state; i.e. initial reflectivity equal to approximately 0.12 .

As the data reveal for a CLC initially in the predominantly planar state, there is an apparent threshold voltage ($V_t$); if the pulse voltage is below the threshold, the state (reflectivity) of the CLC is unchanged by the pulse. At pulse voltages above the threshold, however, the state of the CLC is progressively changed to a more light-scattering, and less light-reflective, state, as shown by the decrease in reflectivity with increasing pulse voltage. At a pulse voltage equal to $V_r$, the CLC transitions to a nematic phase and then relaxes to a light-reflective planar state when the pulse is removed. Thus, the pulse voltage $V_r$ is the maximum voltage at which a zero-field stable reflective (planar) state is realized; i.e. voltages above $V_r$ drive the CLC into the unstable nematic phase.

With continuing reference to FIG. 6, the voltage $V_c$ is defined as the critical phase change voltage; for pulse voltages between $V_c$ and $V_r$, a phase change from the cholesteric phase to the nematic phase is partially induced in the CLC domains. Also, the voltage $V_s$ is used to describe the driving voltage necessary to drive a CLC initially in the light-reflecting planar state to the light-scattering focal-conic state; the value of $V_s$ being intermediate between $V_t$ and $V_c$. Experimental data reveal that, for a particular CLC, the values of $V_t$, $V_s$, $V_c$, and $V_r$ are a function of the width of the driving pulse applied; in general, the values increase with decreasing pulse widths.

Those skilled in the art will recognize from the data illustrated in FIG. 6 that the CLC can be driven between a light-reflective planar and a light-scattering focal-conic state by applying a pulse having an appropriate amplitude, and vice versa. It has been observed, however, that the time required to drive a CLC from a focal-conic state to a planar state is quite different from the time required to change from a planar state to a focal-conic; the former possibly requiring tens of microseconds, while the latter is in the order of milliseconds.

It has been observed that the predominantly planar state (i.e. reflectivity approximately equal to "1") of a CLC can only be achieved by applying a high-voltage at or above the voltage $V_r$, which homeotropically aligns the CLC in a field-induced nematic phase, and then quickly removing the applied voltage. If the CLC is initially in a predominantly planar state P, an applied electrical field can convert the CLC into a predominantly focal-conic state F by a pulse voltage slightly below the critical phase change voltage $V_c$, provided that the pulse duration is sufficiently long. Alternatively, a CLC can be transitioned to a predominantly focal-conic state F by applying a high-voltage at or above the voltage $V_r$, which homeotropically aligns the CLC in a field-induced nematic phase, and then applying a lower-voltage pulse or gradually reducing the pulse voltage to force the liquid crystal to transition to a predominantly focal-conic state. The present invention recognizes that it takes less time to switch to a predominantly focal-conic state by driving the CLC with a high-voltage pulse into the field-induced nematic phase and then applying a lower-voltage pulse, than by driving the CLC with a sufficiently-long duration pulse having a voltage slightly below the critical phase change voltage $V_c$. An additional advantage of this method is that, by first driving a CLC into the nematic phase, the predominantly focal-conic state realized always has the same low reflectivity (i.e. substantially "black"). In contrast, the reflectivity of the resulting focal-conic state arrived at by other driving methods is sensitive to the thickness of the CLC employed, the pulse voltage and the pulse duration. The sensitivity of the electro-optical response characteristic of a CLC to variations in pulse duration can be described with reference to FIG. 7.

Turning now to FIG. 7, illustrated are exemplary electro-optical response characteristics of a CLC for driving pulses of different durations; FIG. 7-*a* illustrating the response characteristic for a driving pulse having a pulse duration of 50 ms; FIG. 7-B illustrating the response characteristic for a driving pulse having a pulse duration of 3 ms; FIG. 7-C illustrating the response characteristic for a driving pulse having a pulse duration of 1 ms; and FIG. 7-D illustrating the response characteristic for a driving pulse having a pulse duration of 70 μs. The reflectivity measurements in FIGS. 7-A, 7-B, 7-C, and 7-D were made under zero-field conditions. The solid circles represent the reflectivity of the CLC, following application of various driving pulses having voltages as shown, for a CLC initially in a predominantly light-reflecting planar state; i.e. initial reflectivity equal to approximately 1. The empty circles represent the reflectivity of the CLC, following application of various driving pulses having voltages as shown, for a CLC initially in a predominantly light-scattering state; i.e. initial reflectivity equal to approximately 0.18. The initial focal-conic state was obtained by applying a high-voltage pulse followed by a lower-voltage pulse; the CLC changing its phase to a field-induced nematic phase in response to the high-voltage pulse and then reforming to a cholesteric-phase focal-conic state in response to the lower-voltage pulse.

It can be noted in FIGS. 7-B, C, and D that, in each case, the lowest point of reflectivity $R_L$ for the electro-optical response of a CLC initially in the predominantly planar state (shown by solid circles) exceeds the reflectivity level of the predominantly focal-conic state (represented by the lower plateau of the curve marked by the empty circles). Thus, an important observation can be made from FIGS. 7-A, B, C, and D: if the CLC is initially in a predominantly light-reflective planar state P, it can only be switched to a predominantly light-scattering focal-conic state F (without first driving the CLC to the nematic phase) with a wide driving pulse (e.g. 50 ms), as shown in FIG. 7-A; i.e. the CLC can not be directly driven from the planar state P to the focal-conic state F with relatively short duration pulses (FIGS. 7-B, C, and D).

Predicated in part by the heretofore-described observations of the effect of various driving-pulse voltages and durations on the electro-optical response of a CLC, the present invention discloses a novel apparatus for and method of driving a CLC flat panel display by which it is possible to drive a CLC at sufficiently-fast frame rates necessary for full-motion video applications. The disclosed method, employing a two-stage driving scheme, takes advantage of the rapid transition of a CLC from a light-scattering focal-conic state to a light-reflective planar state. The two-stage driving scheme includes an "initialization" and an "addressing" stage.

Figure 8:
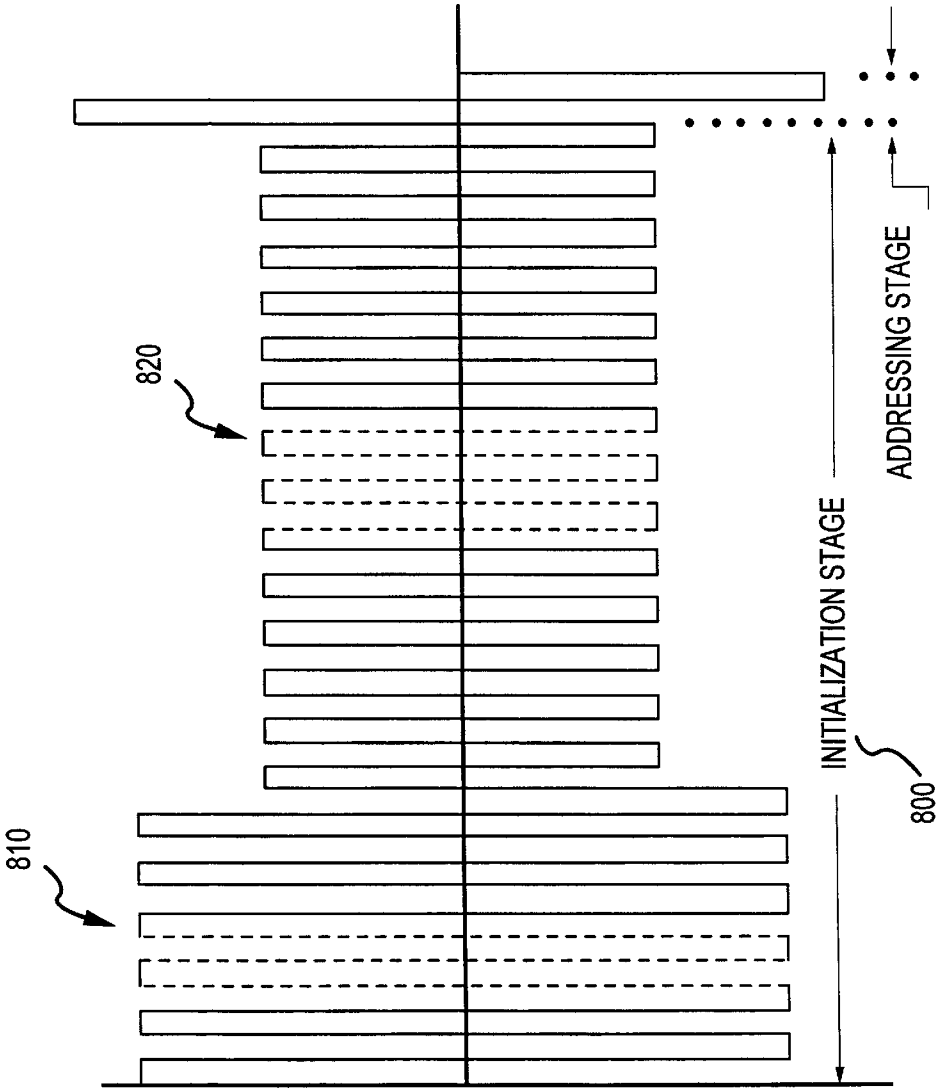
FIG. 8 illustrates exemplary waveforms and an exemplary timing sequence for a CLC driving apparatus and method according to the principles of the present invention.

Turning now to FIG. 8, illustrated are exemplary waveforms and an exemplary timing sequence for a CLC driving method according to the principles of the present invention. The first stage of the disclosed method is the initialization stage 800 in which the pixels of the CLC display are selectively driven to a focal-conic state; the second, or "addressing," stage consisting of selectively driving the CLC pixels to a desired display state. The desired display state of each pixel can be a predominantly light-scattering focal-conic state (i.e. the initial state following the initialization stage), a predominantly light-reflecting planar state, or any intermediate state between the predominantly light-scattering focal-conic and predominantly light-reflecting planar states. In the initialization stage, two sequences of pulses are selectively applied to pixels of the CLC; a pixel being driven into the nematic phase by a first sequence of high-amplitude pulses 810, which are followed by a second sequence of low-amplitude pulses 820, which cause the pixel's CLC domains to transition from the nematic phase to a predominantly focal-conic state. Following the initialization sequence, the selected pixel is in a light-scattering state (regardless of the initial state of the pixel), which has a substantially "black" appearance. The purpose of the initialization stage is to erase the previous state "memorized" in the pixel and prepare the pixel for a new state in the addressing stage.

Figure 9A:
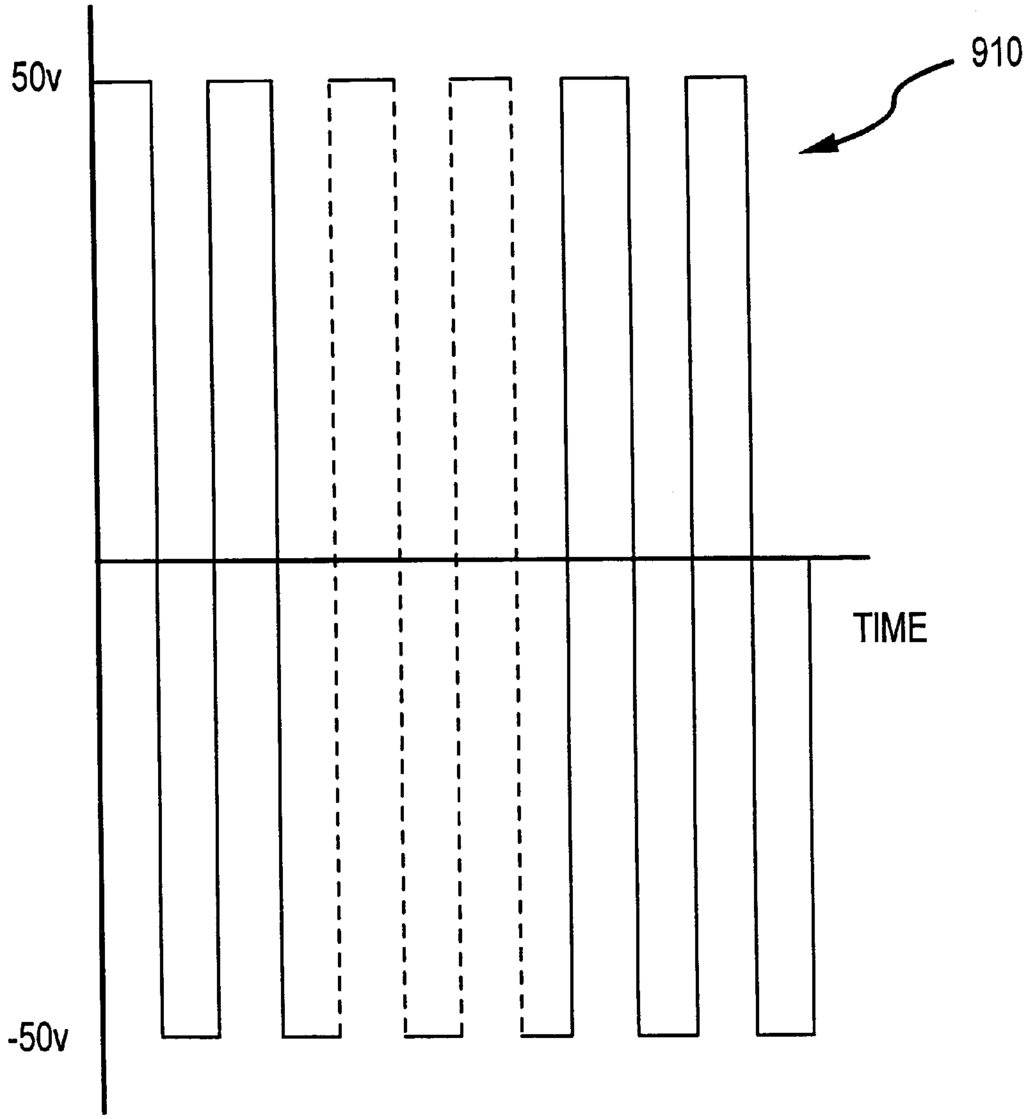
FIG. 9-A illustrates an exemplary first pulse sequence of an initialization waveform for a CLC driving apparatus and method according to the principles of the present invention.
Figure 9B:
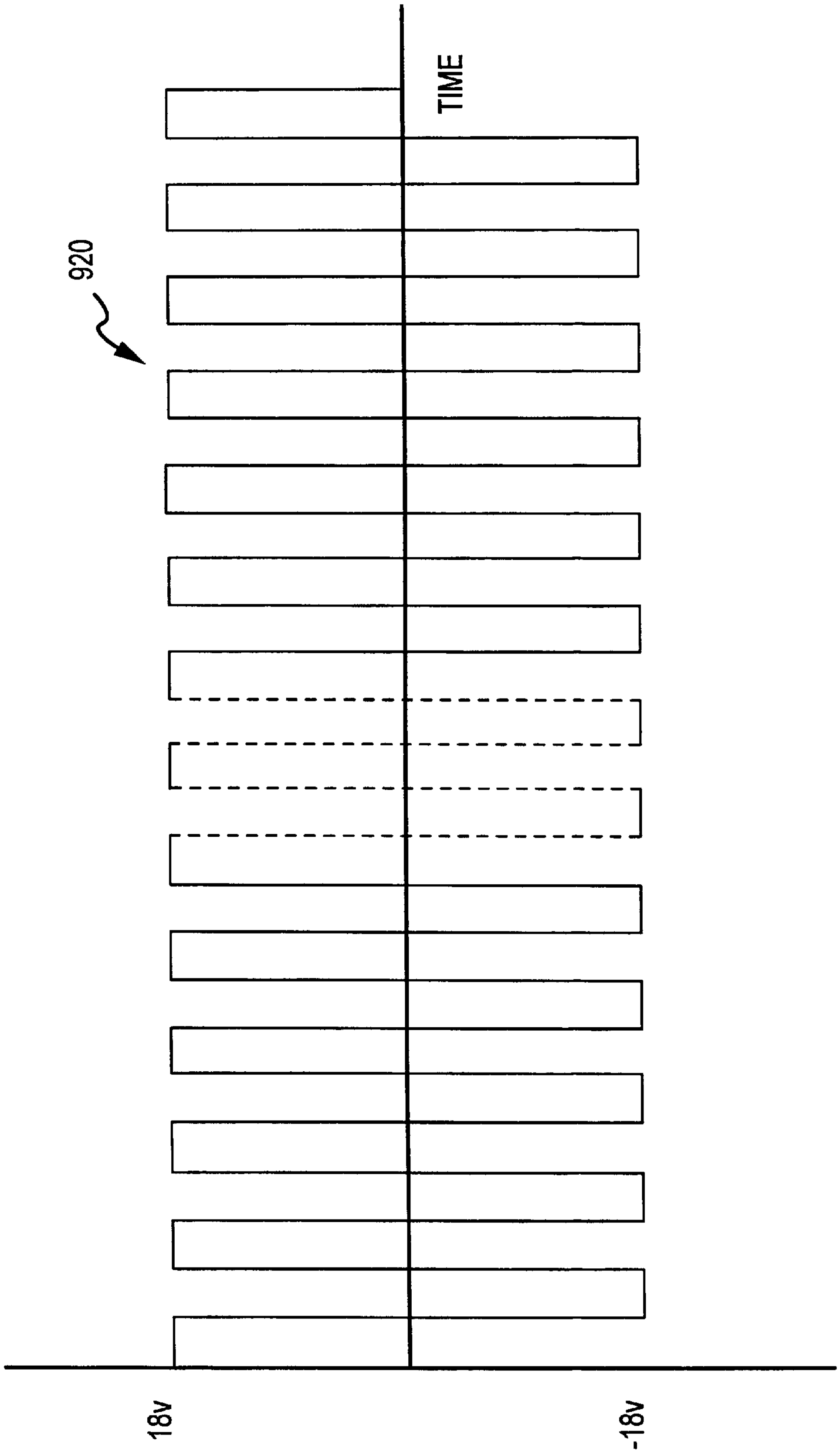

Turning now to FIGS. 9-A and 9-B, illustrated are an exemplary first pulse sequence 910 and an exemplary second pulse sequence 920 of an initialization waveform for a CLC driving apparatus and method according to the principles of the present invention. In one embodiment, the frequency of the pulses is selected to be 14.3 kHz; the first sequence of pulses 910 having an amplitude of 50 volts and a duration of 2 ms (FIG. 9-A); the second sequence of pulses 920 having an amplitude of 18 volts and a duration of 4 ms (FIG. 9-B); the specific pulse amplitudes and durations required for a CLC are a function of the electro-optical response of each particular embodiment, defined in part by the CLC material and thickness employed.

The initialization stage is very important to realize a CLC display capable of operating at full-motion video frame rates. For a CLC display having a matrix of pixels, the state of each pixel should be switched as quickly as possible. Thus, as described supra, the relatively-slow speed (in the order of milliseconds) at which a CLC can be switched from a predominantly light-reflective planar state to a predominantly light-scattering focal-conic state should be avoided. This is accomplished by only employing, in the addressing stage, the relatively-fast speed (in the order of tens of microseconds) at which a CLC can be switched from a predominantly light-scattering focal-conic state to light-reflective planar and intermediate states. Thus, to only employ state transitions from a focal-conic state to a planar or intermediate state during the addressing stage, it is necessary to drive each pixel to a predominantly focal-conic state during an initialization stage; a predominantly focal-conic state providing a reference state from which each pixel can be driven very quickly to any desired state during the addressing stage. Although the initialization stage may require milliseconds to perform, every pixel in a display, or in selected rows, can be initialized at the same time. Because the display pixels can only be addressed by rows, as hereinafter described, the display frame rate is primarily affected by the time required for addressing. The novel driving method disclosed herein minimizes the time required for addressing, thereby maximizing a CLCs frame rate.

Figure 10:
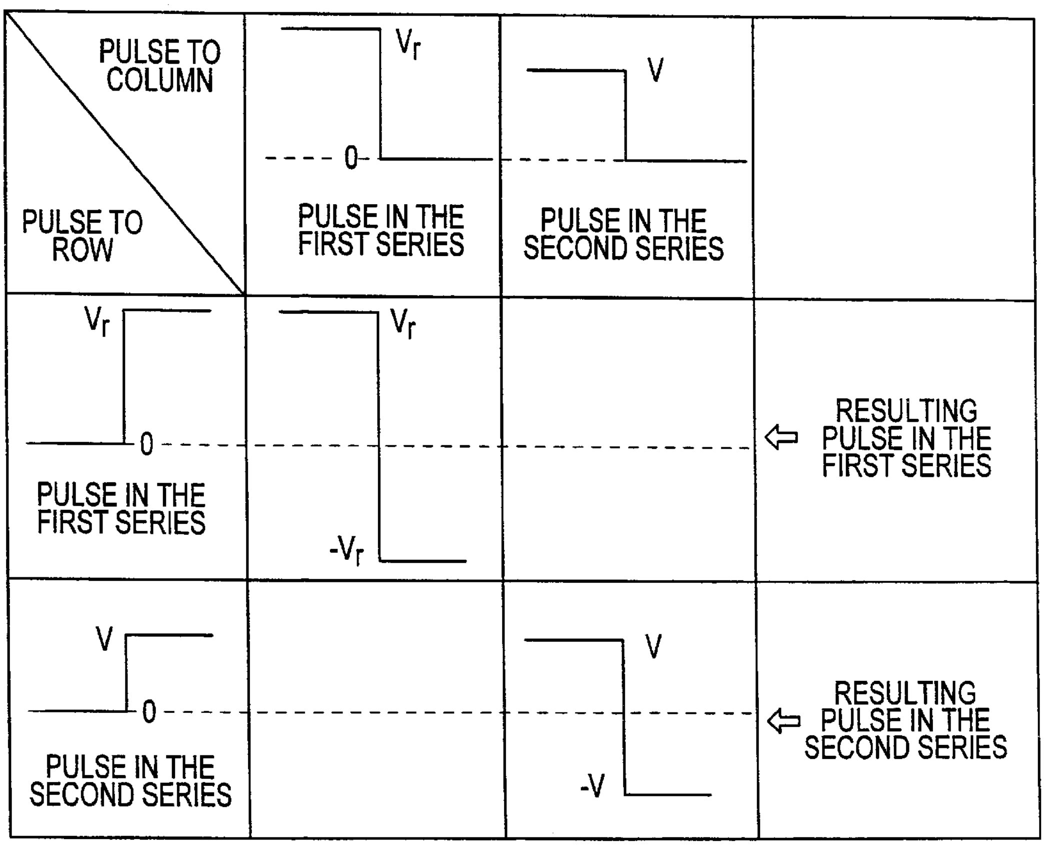
FIG. 10 illustrates exemplary column and row initialization signals for a frame initialization CLC driving method according to the principles of the present invention.

Two specific embodiments for employing the driving methods disclosed by the present invention are the "frame initialization" and the "multi-row initialization" techniques. The frame initialization technique disclosed herein employs polar drive signals, selectively applied to column and row electrodes. In the frame initialization technique, every display pixel is first initialized to a predominantly focal-conic state. FIG. 10 illustrates exemplary column and row initialization signals for a frame initialization CLC driving technique. All pixels are driven to a predominantly focal-conic state by two consecutive pulse sequences. The signals illustrated in the first row and first column of FIG. 10 are polar pulses, which are applied simultaneously to the row and column electrodes. The resulting electric field waveforms applied on each pixel (shown in the center section of FIG. 10) are a combination of the signals applied on the corresponding row and column electrodes. Although the input signal to each row and column electrode is polar, the combined waveforms acting on each pixel are bi-polar; thus, DC signal components, which can ionize a CLC and thereby reduce the life of the cell, are eliminated.

Figure 11:
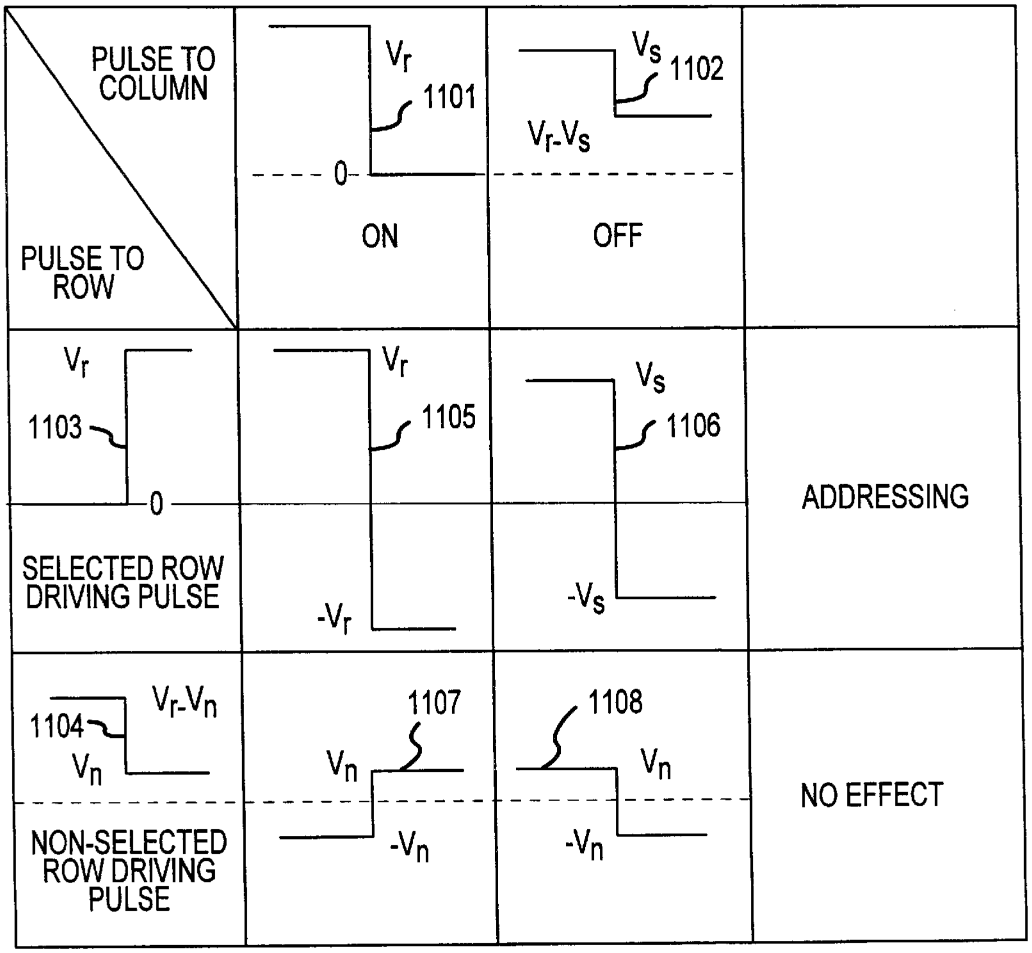
FIG. 11 illustrates exemplary column and row polar addressing signals for a frame initialization CLC driving method according to the principles of the present invention.

Turning now to FIG. 11, illustrated are exemplary column and row polar addressing signals for a frame initialization CLC driving method according to the principles of the present invention. The signals illustrated in the first row and first column of FIG. 11 are polar pulses, which are applied simultaneously to the row and column electrodes. The resulting electric field waveforms applied on each pixel (shown in the center section of FIG. 11) are a combination of the signals applied on the corresponding row and column electrodes. Although the input signal to each row and column electrode is polar, the combined waveforms acting on each pixel are bi-polar; thereby avoiding the undesirable effect of DC signal components, as described supra.

In order to drive a LC matrix display using a passive driving method, those skilled in the art will understand that it is important to recognize that an addressing signal applied to a column electrode will influence the electrical field appearing across every pixel in that column; the CLC threshold voltage $V_t$ (reference FIG. 6, described supra) being a limiting factor for the signals employed. Furthermore, the addressing signals must optimize the switching (i.e. state transition) of selected pixels over non-selected pixels. Thus, to eliminate the crosstalk generally associated with passive-matrix LC driving methods, the voltage of the applied pulse on the pixels in each non-selected row must be below the threshold voltage $V_t$. For a selected row, a higher-voltage pulse having an amplitude $V_r$ should be applied to the pixels for which a state change is desired, while a lower-voltage pulse having an amplitude $V_s$ should be applied to the pixels for which a state change is not desired.

The addressing method may preferably use the conventional practice of selectively applying "data" signals to column electrodes and "scan" signals to row electrodes; as used herein, both "data" signals and "scan" signals are components of "addressing" signals. A CLC display frame can be completely addressed by sequentially activating each row of pixels with a scan signal 1103 while selectively applying data signals 1101, 1102 for each pixel in a selected row to the column electrodes; the pixels in a row being driven by a combined bi-polar pulse 1105/1106 having an amplitude of $V_r$ or $V_s$ during addressing of the selected row. If the state of a pixel is to be changed, the data signal applied to the column containing the pixel has an amplitude of $V_r$; otherwise, the data signal has an amplitude of $V_s$.

In order to maintain the states of all pixels in non-selected rows, the following formula should be satisfied to determine an appropriate driving pulse 1104 for non-selected rows:

$$V_n = \frac{V_r - V_s}{2} < V_t.$$

From this requirement, it is clear that the voltage $V_r$ is limited by: $V_r < 2\ V_t + V_s$. For an appropriate driving pulse 1104 having an amplitude $V_n$, the state of a pixel in a non-selected row will not be changed, regardless of whether column driving signal 1101 or 1102 is applied to the pixel's column electrode.

The general approach to driving a passive-matrix CLC display using the frame initialization driving technique can be summarized as: frame initialization and row-to-row addressing. All pixels in a frame are simultaneously initialized to a predominantly focal-conic state by two pulse sequences as described with reference to FIGS. 8–10. During the initialization stage, all of the rows in a frame are selected, and each pixel is driven by a first sequence of pulses to change from a cholesteric phase to a field-induced nematic phase; a second sequence of pulses driving each pixel to a cholesteric-phase predominantly focal-conic state. To initialize a total frame may only require several milliseconds. In the addressing stage, an addressing signal 1103 (FIG. 11) having an amplitude $V_r$ is applied to the row electrode for the selected row. Depending on the desired state of each pixel in the selected row, the signal applied to the column electrodes are either an "ON" waveform 1101 or "OFF" waveform 1102 as shown in FIG. 11. Each pixel in a selected row is driven by the combination of signals applied to the row and column electrodes. A non-selected row driving signal 1104 is applied to each row other than the row currently being addressed. The amplitude of the combined bi-polar pulses applied to each pixel in a non-selected row is always below the threshold voltage $V_t$, and thus there is no effect on the state of the pixels in a non-selected row. The stability of the CLC cholesteric phase maintains the image on the display until initialization of the next frame. In some applications, an idle period may be required between frame initializations to improve the contrast ratio of the display. The time between each frame initialization is the frame driving time; the reciprocal of the driving time is the frame rate.

The frame initialization technique described above may be suitable for certain applications, but a disadvantage of the technique, however, is that (except for the first row of pixels in a frame) the addressing of each pixel can not be performed immediately following the initialization of the pixel. Moreover, since the pixels in a frame are initialized at the same time but addressed at different times, the static display time of each pixel will be different. A second embodiment for employing the driving methods disclosed by the present invention is the "multi-row initialization" technique, which uses bi-polar driving signals to overcome the disadvantages of the frame initialization technique.

Figure 12:
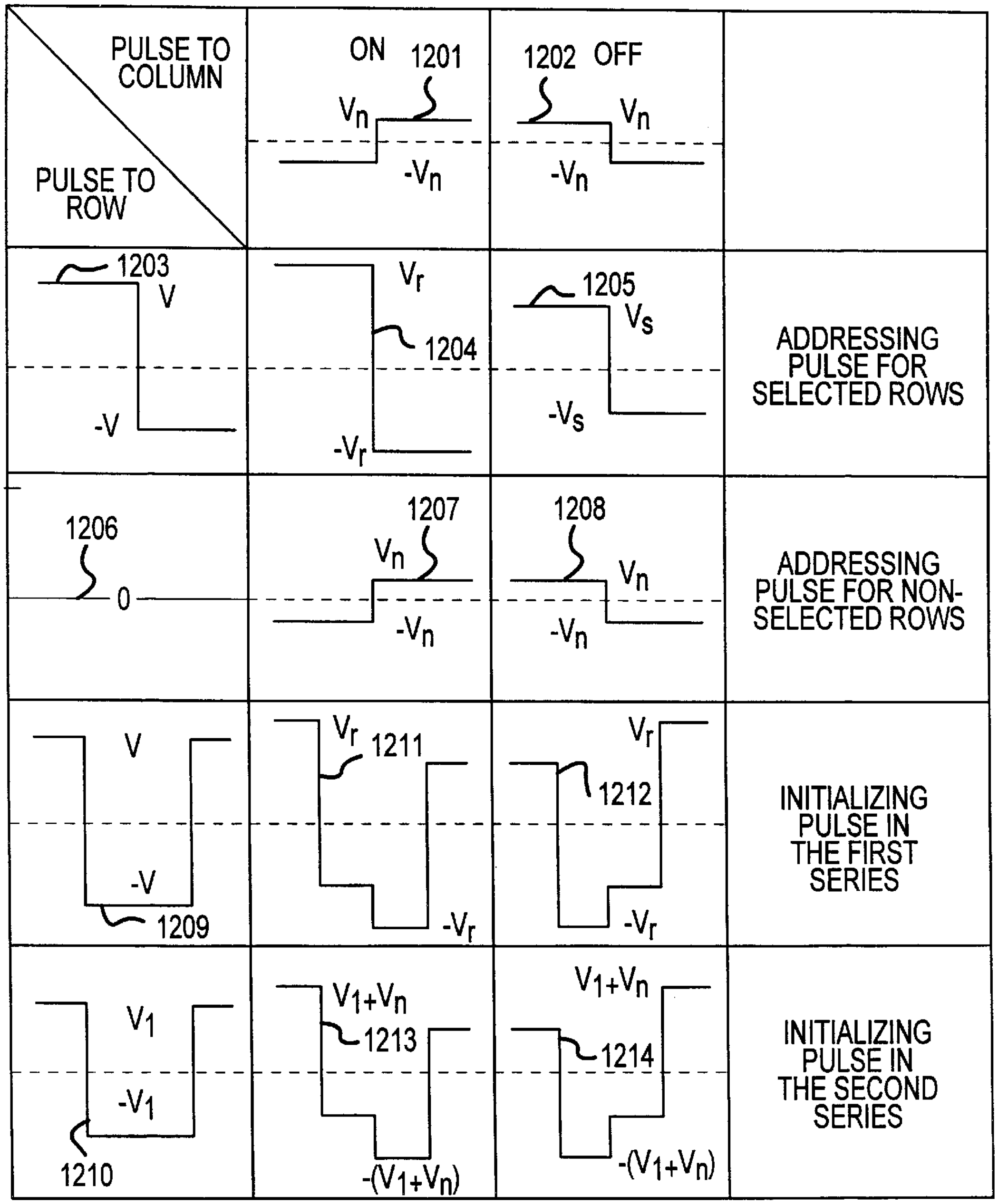
FIG. 12 illustrates exemplary column and row initialization and addressing signals for a multi-row CLC driving method according to the principles of the present invention.

FIG. 12 illustrates exemplary column and row initialization and addressing signals for a multi-row initialization CLC driving technique. Similar to FIGS. 10 and 11, FIG. 12 illustrates the driving signals applied to row and column electrodes. All of the signals, however, are symmetric bi-polar, rather than polar, waveforms. Using the multi-row addressing technique, high-voltage bi-polar signals are applied to the row electrodes and low-voltage bi-polar signals are applied to the column electrodes.

The first row of FIG. 12 illustrates exemplary waveforms 1201, 1202 for column electrode addressing signals corresponding to "ON" and "OFF" states. The waveform 1203 illustrates an exemplary addressing pulse that is applied to the row electrode of a selected row of pixels. The waveform 1204 illustrates the combined pulse applied to a pixel in the selected row that is to be driven to the "ON" state; the waveform 1205 illustrates the combined pulse applied to a pixel that is to be maintained in the predominantly focal-conic ("OFF") state. In order to drive a pixel "OFF", or "ON", the addressing signal applied to a row electrode for a selected row must be in phase or out of phase, respectively, with the addressing signal applied to a pixel's column electrode. The "waveform" 1206 is a zero voltage applied to the row electrode of each non-selected row. The waveforms 1207, 1208 illustrate the combined pulses applied to each pixel in a non-selected row. Because the amplitude of the pulses 1207, 1208 are below the CLC threshold voltage $V_t$, the pulses will not affect the state of the pixels.

In accordance with the principles of the present invention, each pixel must be initialized prior to being addressed. The waveforms 1209, 1210 in FIG. 12 illustrate a first and second sequence of signals (described supra), respectively, that are applied to the row electrodes of each row of pixels that is to be initialized. The waveforms 1211, 1212 and 1213, 1214 illustrate the combined signals applied to each pixel during the first and second sequence of initialization signals, respectively. The voltages V and $V_1$ for the row initialization signals 1209, 1210 are selected such that the amplitudes of the first and second sequence of combined initialization signals drive each pixel to a nematic phase and, subsequently, to a predominantly focal-conic state, as described supra.

The frequency of the signals 1201, 1202 applied to the column electrodes preferably have the same frequency as the addressing signals 1203, 1206 that are applied to the row electrodes. The frequency of the signals 1209, 1210 for the initialization stage, denoted as $f_i$, and the frequency of the addressing signals 1203, 1206, denoted as $f_a$, however, can be different, provided the following relationship is satisfied:

$$f_a = Nf_i,$$

where N is a positive integer. The signals illustrated in FIG. 12 are for the case where N is equal to 1. When N=1, the phase difference between the initialization signals 1209, 1210 applied to the row electrodes and the signals 1201, 1202 applied to the column electrodes must equal 90°.

Using the combined signal waveforms 1204, 1205, 1207, 1208, 1211–1214 illustrated in FIG. 12, the present invention recognizes that four different signals can be applied simultaneously to four different rows of a CLC display, without any crosstalk. One, or more, rows can be initialized at the same time that another row is being addressed. Thus, the addressing stage for every row can immediately follow the initialization stage for that row. An advantage of the bi-polar multi-row initialization technique is that every pixel can have the same "dynamic" and "static" display times. The dynamic display time is defined as the time during which the pixel is being driven by an electrical field, and the static display time is defined as the time during which the pixel is not being driven; i.e. the pixel is in a stable cholesteric phase.

Referring again to FIG. 6, those skilled in the art will recognize that a CLC can be driven from a light-reflective planar to a light-scattering focal-conic state by applying a pulse having an appropriate amplitude, and vice versa. As noted supra, U.S. Pat. No. 5,453,863, issued to West, et al. on Sep. 26, 1995, discloses the use of signals of varying electrical magnitudes to transform the CLC from focal-conic to planar states, and vice versa; a continuum of signal magnitudes being used to drive the CLC to intermediate "gray scale" states. The portion of a typical CLC electro-optical response curve corresponding to the intermediate (i.e. gray scale) states has a steep slope; i.e. the portion of the curve corresponds to a narrow voltage range over which signals of varying electrical magnitudes can be used to drive a CLC to different intermediate states. Because the voltage range is typically narrow, a principal disadvantage of the method disclosed by West, et al. is that it is difficult to precisely drive the CLC to a preferred intermediate state. Furthermore, the electro-optical response curve of a CLC will shift to the left or right with variations in the cell gap (i.e. the thickness of the CLC). Because the portion of a typical CLC electro-optical response curve corresponding to the intermediate (i.e. gray scale) states has a steep slope, even a slight shift in the curve will cause a particular drive voltage to produce different intermediate states in pixels having slightly different cell gaps. The present invention recognizes that a gray scale CLC display can be realized by applying a single pulse, or sequence of pulses, having a fixed predetermined amplitude; each successive pulse causing a progressive change in the state of the CLC. Thus, the method disclosed herein for driving a CLC display does not rely on the use of signals of varying electrical magnitudes to realize a gray scale display, but employs pulses having a fixed predetermined amplitude whereby each gray scale level (i.e. intermediate state) is a function of a duration of the pulses.

According to the two-stage driving techniques disclosed herein, each pixel is first initialized to a predominantly focal-conic state. In response to an address pulse, or sequence of address pulses, a progressive change from the predominantly focal-conic state to the predominantly planar state can be obtained. Moreover, it has been observed that each intermediate, or gray scale, state is perfectly stable under zero-field conditions. Furthermore, a benefit of employing a single address pulse, or sequence of address pulses, having a fixed predetermined amplitude is that the gray scale states can be precisely controlled.

To employ the pulse-sequence addressing technique to full advantage, those skilled in the art will recognize that it is important to equalize the addressing-stage driving time for each pixel in a selected row. Because the technique requires either a single pulse or a sequence of pulses to drive a pixel from a predominantly focal-conic state to a predominantly planar state, and states therebetween, the minimum time to address each pixel is a function of the desired state. Thus, to compensate for the different times required to change a pixel from an initial state to a desired state, a sequence of pulses having an amplitude which has no effect on a pixel's state can be applied ahead of a sequence of pulses having an amplitude sufficient to cause a change in state.

Figure 13:
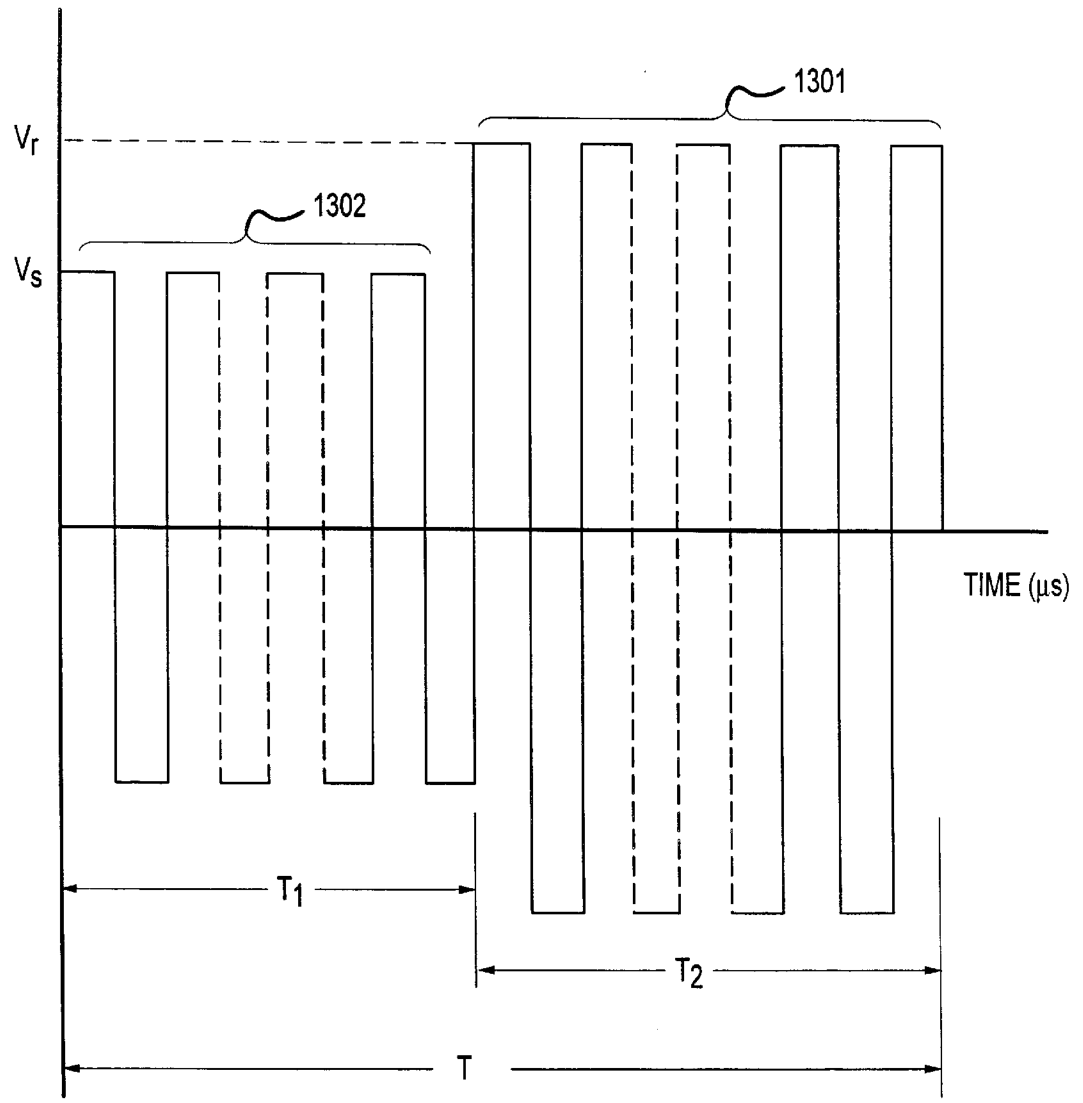
FIG. 13 illustrates an exemplary addressing waveform pulse sequence for a gray-scale CLC driving method according to the principles of the present invention.

FIG. 13 illustrate an exemplary addressing waveform pulse sequence for a gray-scale CLC driving apparatus and method according to the principles of the present invention. The duration of the two pulse sequences 1301, 1302 is equal to a predetermined addressing time T, which is equal to or greater than the time necessary to drive a pixel from a predominantly focal-conic state to a predominantly planar state; if the desired pixel state is intermediate these states, a sequence of pulses 1302 having an amplitude which has no effect on the pixel's state is applied ahead of the sequence of pulses 1301 having an amplitude sufficient to cause a change in state. $T_1$ is the duration of the lower-voltage pulse sequence and $T_2$ is the duration of the higher-voltage pulse sequence; those skilled in the art will recognize that the order of applying pulse sequences 1301, 1302 may be reversed.

The gray scale state of each pixel is determined by the ratio of the duration $T_2$ of the sequence of pulses 1301 to the predetermined addressing time T. The amplitude of the sequence of pulses (or single pulse) 1301 is equal to the phase change voltage $V_r$, for the specific CLC employed, that corresponds to a single addressing pulse having a pulse width of T; i.e. if a pulse of duration T and amplitude $V_r$ is applied to the CLC, the CLC will transition to the nematic phase. The number of distinct gray scale states is determined by the frequency of the address pulses; e.g. if eight pulses can occur during time T, then an eight-level gray scale for each pixel can be realized.

Figure 14:
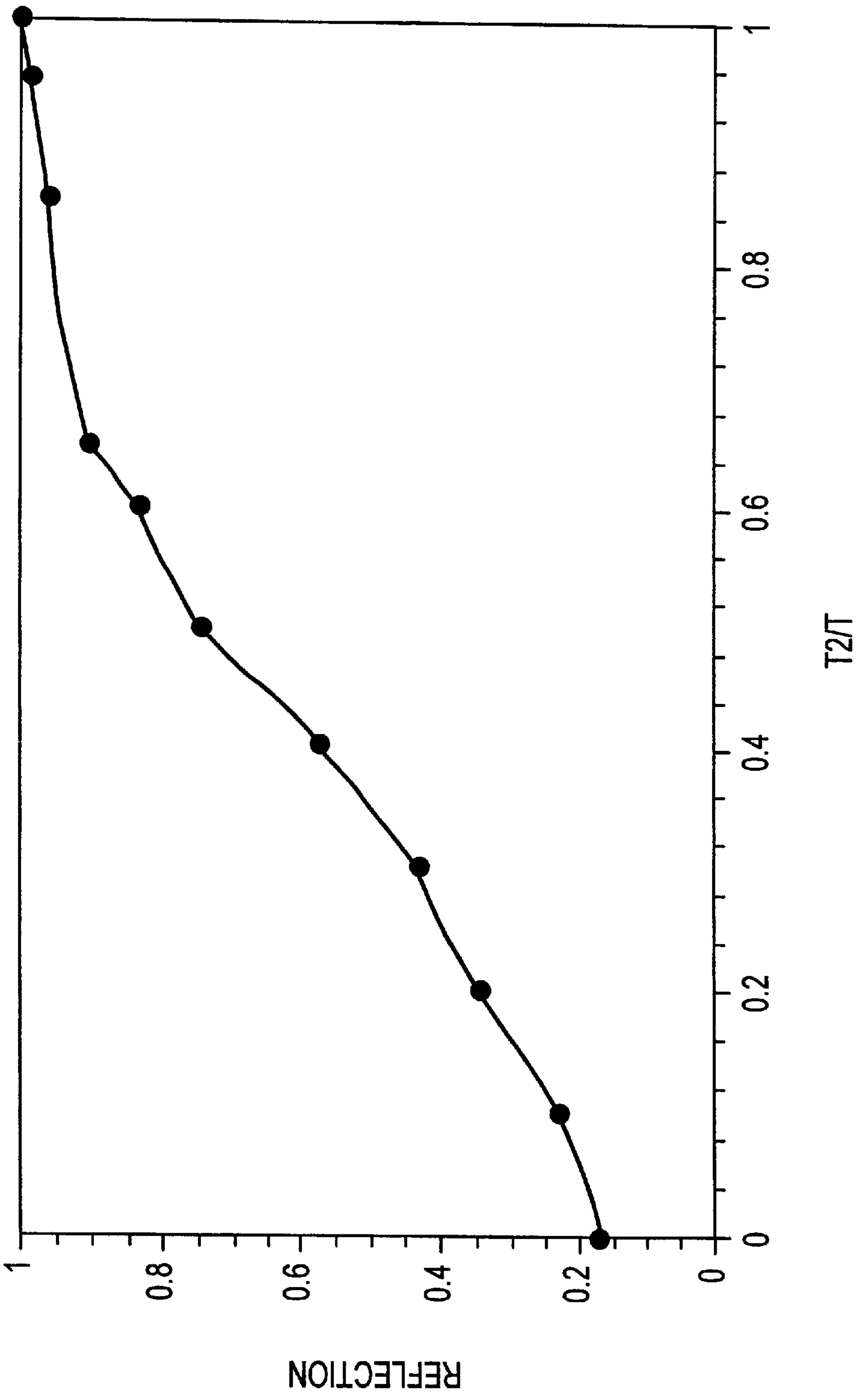
FIG. 14 illustrates an exemplary electro-optical response characteristic of a CLC for addressing waveform pulse sequences of different pulse sequence durations.

Turning now to FIG. 14, illustrated is an exemplary electro-optical response characteristic of a CLC for addressing waveform pulse sequences of different pulse sequence durations $T_2$; the reflectivity of a single cell, measured under zero-field conditions, being plotted as a function of the ratio of $T_2$ to T. Those skilled in the art will observe the wide linear region which can be employed to advantage to realize a gray scale CLC display. Because the reflectivity is a function of the ratio of $T_2$ to T, which can be accurately controlled, the method disclosed herein does not suffer from the disadvantages associated with using a magnitude of the driving signal to control the reflectivity, as disclosed by West, et al. (described hereinabove). Furthermore, even though the curve illustrated in FIG. 14 may shift to the left or right as a function of the CLC cell gap, those skilled in the art will recognize that, because of the wide linear region, a slight shift in the curve will only have a negligable effect on the resulting cell reflectivity.

Figure 15:
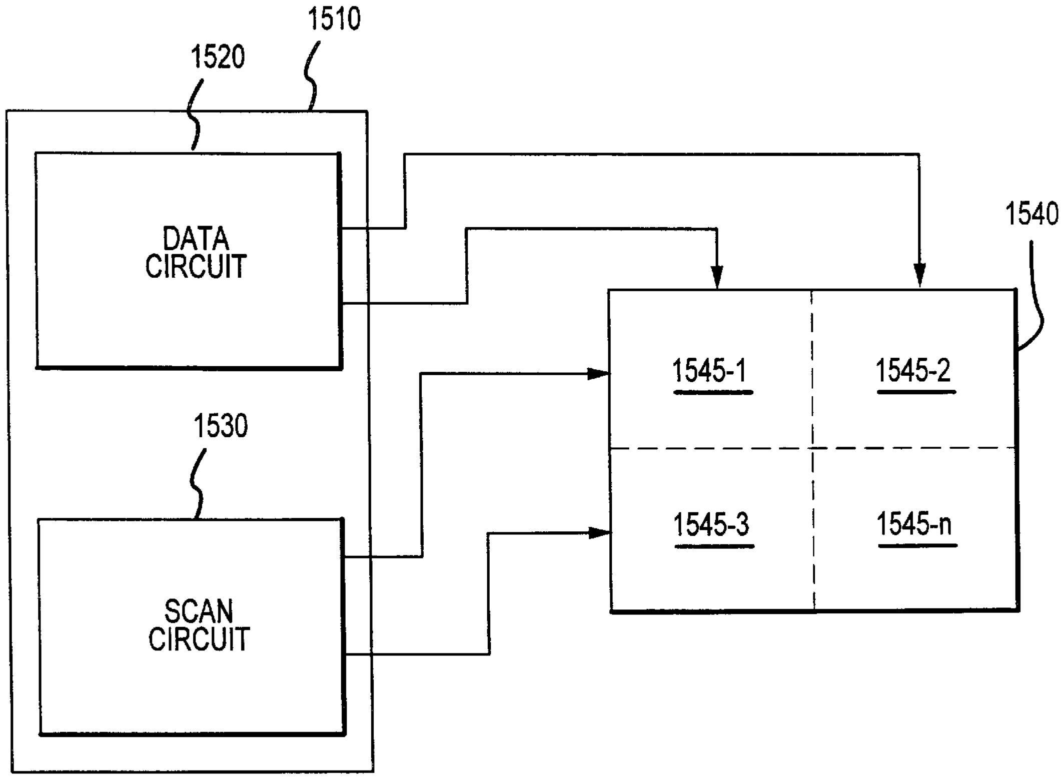
FIG. 15 illustrates an exemplary apparatus for employing the method for driving a CLC display according to the principles of the present invention.

Turning now to FIG. 15, illustrated is an exemplary apparatus for employing the above-described method for driving a CLC display according to the principles of the present invention. FIG. 15 illustrates a driving apparatus 1510 coupled to a CLC panel 1540. In one embodiment, the CLC panel 1540 includes a plurality of controllable display elements 1545-1, 1545-2, 1545-3, **1545-*n* (e.g. pixels) defined by a matrix of row and column electrodes (not shown). The driving apparatus includes a data circuit 1520 that is coupled to the column electrodes and a scan circuit 1530 that is coupled to the row electrodes of CLC panel 1540. The data circuit 1520 and scan circuit 1530 selectively apply the initialization and addressing signals disclosed hereinabove to the CLC panel 1540, the signals applied to the column electrodes cooperating with the signals applied to the row electrodes to selectively drive each controllable display element 1545 from a predominantly focal-conic state to a predominantly planar state, and intermediate states therebetween. The principles of the present invention are not limited to a particular embodiment of the driving apparatus 1510, except to the extent that data circuit 1520 and scan circuit 1530** must be suitably operative to generate initialization and addressing signals in accordance with the principles of the present invention.

Those of skill in the art understand the effect of ambient temperature on the performance of CLC displays; particularly at relatively-low temperatures. The response of a CLC to an applied voltage is directly related to the viscosity of the CLC material; the viscosity generally rising exponentially with decreasing temperature, which results in a corresponding increase in the response time of the CLC. At a particular temperature, the viscosity of the CLC material is related to the material's structure. Thus, the synthesization of low-viscosity CLC materials is one approach to avoid slower response times at low temperatures; however, only slight improvements in CLC viscosity at low temperatures can be anticipated. A second approach to overcome the problem of low viscosity at low temperatures is to compensate for the change in viscosity by altering the driving waveforms applied to the CLC.

Figure 16A:
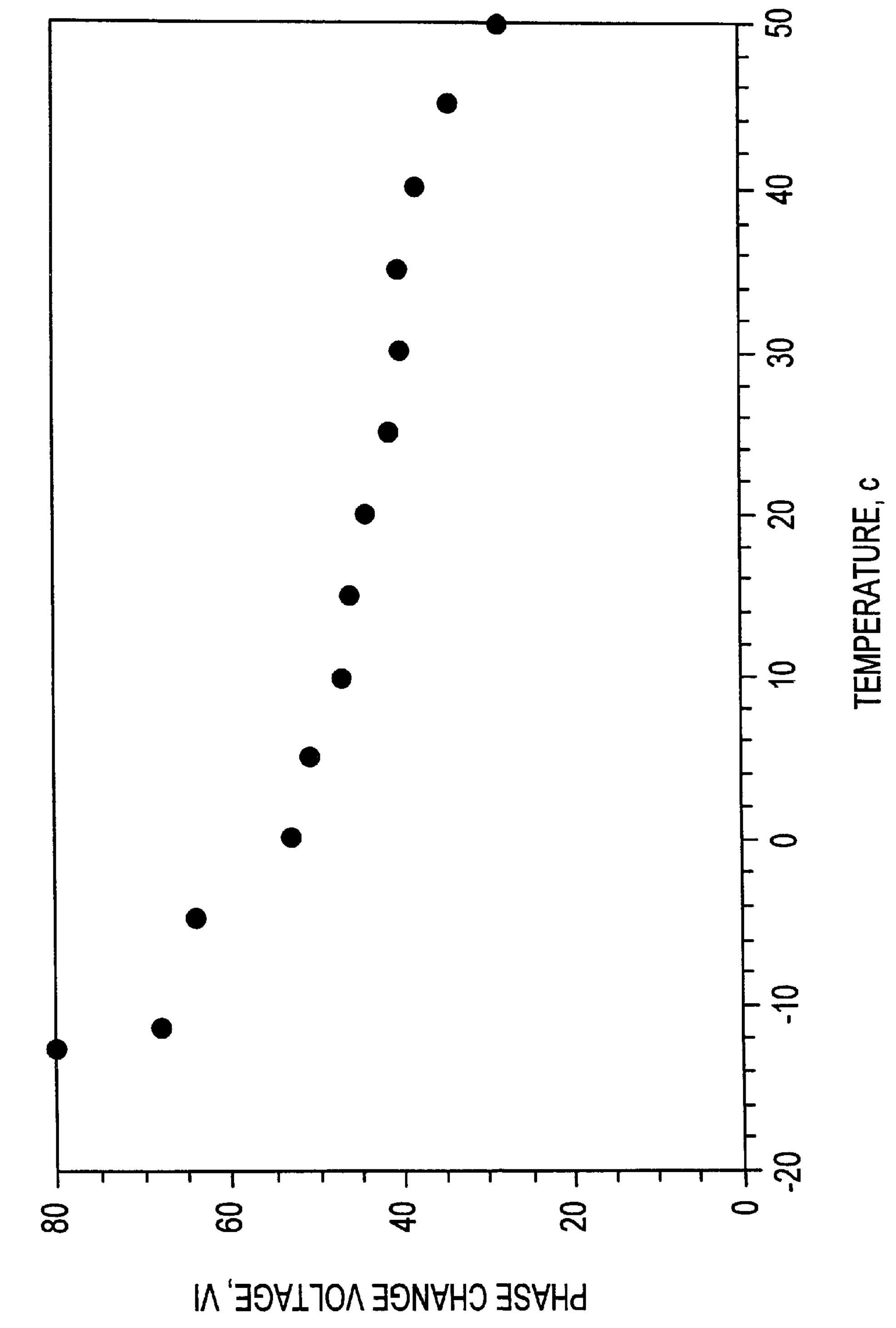
FIG. 16-A illustrates the effect of temperature on the phase change voltage $V_r$ of an exemplary CLC.
Figure 16B:
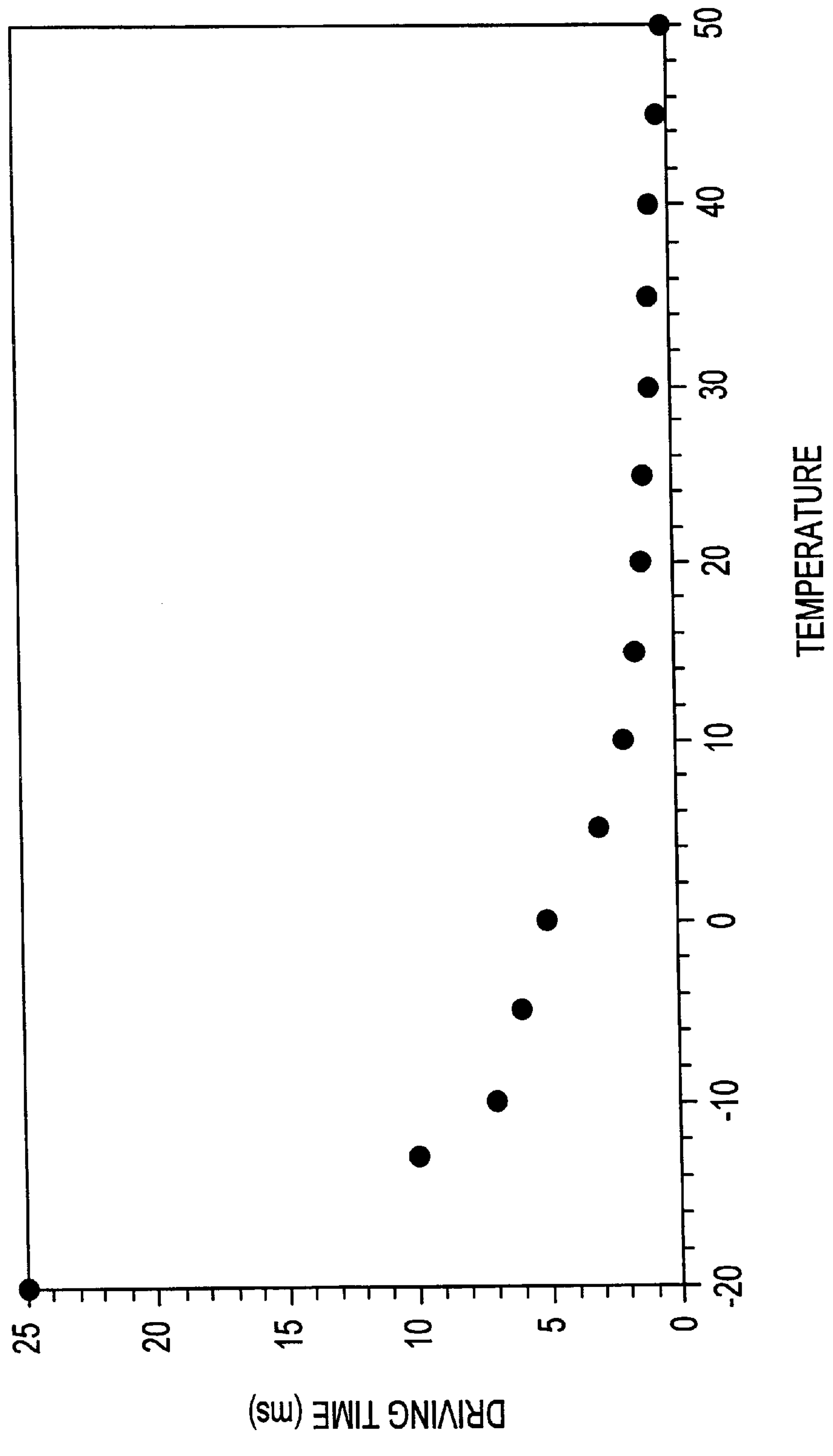

Turning now to FIG. 16-A, illustrated is the effect of temperature on the phase change voltage $V_r$ of an exemplary CLC, for a driving time of 5 ms. As can be seen, the phase change voltage $V_r$ increases with decreasing temperature. Referring to FIG. 16-B, which illustrates the effect of temperature on the required driving time for an applied voltage of 40 volts, it can be seen that the driving time rises exponentially with decreasing temperature. Thus, in order to realize full-motion video frame rates at low temperatures, employing the driving methods disclosed hereinabove, the effects of temperature on display driving time can be compensated for by increasing the driving voltage. A feedback mechanism, which senses the temperature of the CLC display, can be employed to provide a temperature compensation signal to the driving apparatus, which can appropriately increase, or decrease, the amplitude of the initialization and addressing signals; alternatively, although less desirable for most applications, the driving apparatus can appropriately increase, or decrease, the duration of the driving signals to compensate for variations in display temperature.

Although the present invention and its advantages have been described in detail, those skilled in the art should understand that they can make various changes, substitutions and alterations herein without departing from the spirit and scope of the invention in its broadest form.

We claim:

1. A method of driving at least a portion of a cholesteric liquid crystal (CLC) panel to a state having a given reflectivity, comprising the steps of:

initially driving said portion to a nematic phase;

subsequently driving said portion to a cholesteric phase focal-conic state, said cholesteric phase focal-conic state providing a known reference state for subsequent driving of said portion; and thereafter driving said portion to said state having said given reflectivity.

2. The method of driving as recited in claim 1 wherein said step of initially driving comprises the step of applying a sequence of pulses to drive said portion to said nematic phase.

3. The method of driving as recited in claim 1 wherein said step of subsequently driving comprises the step of applying a sequence of pulses to drive said portion to said cholesteric phase focal-conic state.

4. The method of driving as recited in claim 1 wherein said step of initially driving comprises the step of applying a first sequence of pulses having a first amplitude to drive said portion to said nematic phase and said step of subsequently driving comprises the step of applying a second sequence of pulses having a second amplitude to drive said portion to said cholesteric phase focal-conic state.

5. The method of driving as recited in claim 4 wherein said first and second amplitudes are a function of a composition of CLC in said CLC panel.

6. The method of driving as recited in claim 4 wherein said first and second amplitudes are a function of a thickness of said CLC panel.

7. The method of driving as recited in claim 1 wherein said step of thereafter driving comprises the step of applying a sequence of pulses to drive said portion from said cholesteric phase focal-conic state to said state having said given reflectivity.

8. The method of driving as recited in claim 1 wherein said state having said given reflectivity is an intermediate state between said cholesteric phase focal-conic state and a cholesteric phase planar state, and wherein said step of thereafter driving said portion to said intermediate state comprises the step of applying a sequence of addressing pulses having a predetermined amplitude to drive said portion from said cholesteric phase focal-conic state to said intermediate state, said given reflectivity being a function of a duration of said sequence of addressing pulses.

9. The method of driving as recited in claim 8 wherein said step of applying a sequence of addressing pulses having a predetermined amplitude is preceded by the step of applying a first sequence of pulses having an amplitude less than a minimum amplitude necessary to drive the CLC from the focal-conic state, a duration of said first sequence of pulses adjusted such that the sum of said duration of said first sequence of pulses and said duration of said sequence of addressing pulses equals a predetermined value.

10. A driving apparatus for a cholesteric liquid crystal (CLC) panel, said driving apparatus comprising:

a data circuit, couplable to said CLC panel, that selectively applies a first initialization signal and a first addressing signal to said CLC panel; and a scan circuit, couplable to said CLC panel, that selectively applies a second initialization signal and a second addressing signal to said CLC panel, said first and second initialization signals cooperating to drive a CLC in said CLC panel into a nematic phase and subsequently to drive said CLC to a cholesteric phase focal-conic state, said first and second addressing signals cooperating to selectively drive said CLC from said cholesteric phase focal-conic state to a state having a given reflectivity.

11. The driving apparatus as recited in claim 10 wherein each of said first and second initialization signals comprises a first sequence of pulses having a first amplitude and a second sequence of pulses having a second amplitude, said first sequence of pulses driving said CLC into said nematic phase and said second sequence of pulses driving said CLC to said cholesteric phase focal-conic state.

12. The driving apparatus as recited in claim 11 wherein said first amplitude and second amplitudes are a function of a composition and thickness of said CLC.

13. The driving apparatus as recited in claim 11 wherein said first and second sequence of pulses have a frequency of about 14.3 kHz.

14. The driving apparatus as recited in claim 11 wherein said first sequence of pulses has a duration of about 2 ms and said second sequence of pulses has a duration of about 4 ms.

15. The driving apparatus as recited in claim 10 wherein each of said first and second addressing signals comprises a sequence of addressing pulses having a predetermined amplitude, said driving apparatus operative to drive said CLC to said state having said given reflectivity by varying a duration of said sequence of addressing pulses.

16. The driving apparatus as recited in claim 15 wherein said predetermined amplitude is a function of a composition and thickness of said CLC.

17. The driving apparatus as recited in claim 15 wherein said first and second sequence of pulses have a frequency of about 14.3 kHz.

18. The driving apparatus as recited in claim 15 wherein said sequence of addressing pulses having a predetermined amplitude is preceded by a first sequence of pulses having an amplitude less than a minimum amplitude necessary to drive said CLC from the focal-conic state, a duration of said first sequence of pulses varied such that the sum of the duration of the first sequence of pulses and the duration of the sequence of addressing pulses has a constant value.

19. The driving apparatus as recited in claim 10 wherein said first and second initialization signals and said first and second addressing signals comprise bipolar electrical waveforms.

20. A driving apparatus for a cholesteric liquid crystal (CLC) panel having first and second electrodes coupled to opposing sides thereof, said driving apparatus comprising:

a data circuit couplable to said first electrode for selectively applying a first initialization signal and a first addressing signal to said CLC panel; and a scan circuit couplable to said second electrode for selectively applying a second initialization signal and a second addressing signal to said CLC panel, said first and second initialization signals cooperating to drive a CLC in said CLC panel into a nematic phase and subsequently to drive said CLC to a cholesteric phase focal-conic state, said first and second addressing signals cooperating to selectively drive said CLC from said cholesteric phase focal-conic state to a state having a given reflectivity.

21. The driving apparatus as recited in claim 20 wherein each of said first and second initialization signals comprises a first sequence of pulses having a first amplitude and a second sequence of pulses having a second amplitude, said first sequence of pulses driving said CLC into said nematic phase and said second sequence of pulses driving said CLC to said cholesteric phase focal-conic state.

22. The driving apparatus as recited in claim 21 wherein said first and second amplitudes are a function of a composition and thickness of said CLC.

23. The driving apparatus as recited in claim 21 wherein said first and second sequence of pulses have a frequency of about 14.3 kHz.

24. The driving apparatus as recited in claim 21 wherein said first sequence of pulses has a duration of about 2 ms and said second sequence of pulses has a duration of about 4 ms.

25. The driving apparatus as recited in claim 20 wherein each of said first and second addressing signals comprises a sequence of addressing pulses having a predetermined amplitude, said driving apparatus operative to drive said CLC to said state having said given reflectivity by varying a duration of said sequence of addressing pulses.

26. The driving apparatus as recited in claim 25 wherein said predetermined amplitude is a function of a composition and thickness of said CLC.

27. The driving apparatus as recited in claim 25 wherein said first and second sequence of pulses have a frequency of about 14.3 kHz.

28. The driving apparatus as recited in claim 25 wherein said sequence of addressing pulses having a predetermined amplitude is preceded by a first sequence of pulses having an amplitude less than a minimum amplitude necessary to drive said CLC from the focal-conic state, a duration of said first sequence of pulses varied such that the sum of the duration of the first sequence of pulses and the duration of the sequence of addressing pulses has a constant value.

29. The driving apparatus as recited in claim 20 wherein said first and second initialization signals and said first and second addressing signals comprise bipolar electrical waveforms.

30. A driving apparatus for a cholesteric liquid crystal (CLC) display having a plurality of controllable display elements, said CLC display having a matrix of row and column electrodes that define each of said controllable display elements, said driving apparatus comprising:

a data circuit couplable to said column electrodes for selectively applying a first initialization signal and a first addressing signal to each of said display elements; and a scan circuit couplable to said row electrodes for selectively applying a second initialization signal and a second addressing signal to each of said display elements, said first and second initialization signals cooperating to drive said controllable display elements into a nematic phase and subsequently to drive said controllable display elements to a cholesteric phase focal-conic state, said first and second addressing signals cooperating to selectively drive said controllable display elements from said cholesteric phase focal-conic state to a state having a given reflectivity.

31. The driving apparatus as recited in claim 30 wherein each of said first and second initialization signals comprises a first sequence of pulses having a first amplitude and a second sequence of pulses having a second amplitude, said first sequence of pulses driving selected ones of said controllable display elements into said nematic phase and said second sequence of pulses driving said selected ones of said controllable display elements to said cholesteric phase focal-conic state.

32. The driving apparatus as recited in claim 31 wherein said first and second amplitudes are a function of a composition and thickness of said CLC.

33. The driving apparatus as recited in claim 31 wherein said first and second sequence of pulses have a frequency of about 14.3 kHz.

34. The driving apparatus as recited in claim 31 wherein said first sequence of pulses has a duration of about 2 ms and said second sequence of pulses has a duration of about 4 ms.

35. The driving apparatus as recited in claim 30 wherein said first and second addressing signals comprise a sequence of addressing pulses having first and second predetermined amplitudes, respectively, said driving apparatus operative to drive said CLC to said state having said given reflectivity by varying a duration of said sequence of addressing pulses.

36. The driving apparatus as recited in claim 35 wherein said first and second predetermined amplitudes are a function of a composition and thickness of said CLC.

37. The driving apparatus as recited in claim 35 wherein said first and second sequence of pulses have a frequency of about 14.3 kHz.

38. The driving apparatus as recited in claim 35 wherein said sequence of addressing pulses is preceded by a first sequence of pulses having an amplitude less than a minimum amplitude necessary to drive said CLC from the focal-conic state, a duration of said first sequence of pulses varied such that the sum of the duration of the first sequence of pulses and the duration of the sequence of addressing pulses has a constant value.

39. The driving apparatus as recited in claim 30 wherein said first and second initialization signals are applied simultaneously to each of said plurality of controllable display elements.

40. The driving apparatus as recited in claim 30 wherein said first and second initialization signals are applied to at least a first selected row of said plurality of controllable display elements, said first and second addressing signals being applied simultaneously therewith to at least a second selected row of said plurality of controllable display elements.

41. The driving apparatus as recited in claim 30 wherein said first and second initialization signals and said first and second addressing signals comprise bipolar electrical waveforms.

42. A method of driving a cholesteric liquid crystal (CLC) display having a plurality of controllable display elements, said CLC display having a matrix of row and column electrodes that define each of said controllable display elements, said method of driving comprising:

selectively initializing at least one of said controllable display elements by applying a first initialization signal to at least one of said column electrodes and a second initialization signal to at least one of said row electrodes, said first and second initialization signals cooperating to drive said at least one of said controllable display elements into a nematic phase and subsequently to drive said at least one of said controllable display elements to a cholesteric phase focal-conic state; and selectively addressing said at least one of said controllable display elements by applying a first addressing signal to said at least one of said column electrodes and a second addressing signal to said at least one of said row electrodes, said first and second addressing signals cooperating to selectively drive said at least one of said controllable display elements from said cholesteric phase focal-conic state to a state having a given reflectivity.

43. The method of driving as recited in claim 42 wherein each of said first and second initialization signals comprises a first sequence of pulses having a first amplitude and a second sequence of pulses having a second amplitude, said first sequence of pulses driving selected ones of said controllable display elements into said nematic phase and said second sequence of pulses driving said selected ones of said controllable display elements to said cholesteric phase focal-conic state.

44. The method of driving as recited in claim 43 wherein said first and second amplitudes are a function of a composition and thickness of a CLC in said CLC display.

45. The method of driving as recited in claim 43 wherein said first and second sequence of pulses have a frequency of about 14.3 kHz.

46. The method of driving as recited in claim 43 wherein said first sequence of pulses has a duration of about 2 ms and said second sequence of pulses has a duration of about 4 ms.

47. The method of driving as recited in claim 42 wherein said first and second addressing signals comprise a sequence of addressing pulses having first and second predetermined amplitudes, respectively, said step of selectively addressing comprising the step of driving ones of said controllable display elements to said state having said given reflectivity by varying a duration of said sequence of addressing pulses.

48. The method of driving as recited in claim 47 wherein said first and second predetermined amplitudes are a function of a composition and thickness of a CLC in said CLC display.

49. The method of driving as recited in claim 47 wherein said first and second sequence of pulses have a frequency of about 14.3 kHz.

50. The method of driving as recited in claim 47 wherein said sequence of addressing pulses is preceded by a first sequence of pulses having an amplitude less than a minimum amplitude necessary to drive said CLC from the focal-conic state, a duration of said first sequence of pulses varied such that the sum of the duration of the first sequence of pulses and the duration of the sequence of addressing pulses has a constant value.

51. The method of driving as recited in claim 42 wherein said step of selectively initializing comprises simultaneously applying said first and second initialization signals to each of said plurality of controllable display elements.

52. The method of driving as recited in claim 42 wherein said step of selectively initializing is performed on at least a first selected row of said plurality of controllable display elements while said step of selectively addressing is performed simultaneously therewith on at least a second selected row of said plurality of controllable display elements.

53. The method of driving as recited in claim 42 wherein said first and second initialization signals and said first and second addressing signals comprise bipolar electrical waveforms.

54. A cholesteric liquid crystal (CLC) display system comprising:

a CLC panel having a plurality of controllable display elements, said CLC panel having a matrix of row and column electrodes that define each of said controllable display elements;

a data circuit coupled to said column electrodes for selectively applying a first initialization signal and a first addressing signal to each of said plurality of controllable display elements; and a scan circuit coupled to said row electrodes for selectively applying a second initialization signal and a second addressing signal to each of said plurality of controllable display elements, said first and second initialization signals cooperating to drive said controllable display elements into a nematic phase and subsequently to drive said controllable display elements to a cholesteric phase focal-conic state, said first and second addressing signals cooperating to selectively drive said controllable display elements from said cholesteric phase focal-conic state to a state having a given reflectivity.

55. The CLC display system as recited in claim 54 wherein each of said first and second initialization signals comprises a first sequence of pulses having a first amplitude and a second sequence of pulses having a second amplitude, said first sequence of pulses driving selected ones of said plurality of controllable display elements into said nematic phase and said second sequence of pulses driving said selected ones of said controllable display elements to said cholesteric phase focal-conic state.

56. The CLC display system as recited in claim 54 wherein said first and second addressing signals comprise a sequence of addressing pulses having first and second predetermined amplitudes, respectively, said CLC display system operative to drive said controllable display elements from said cholesteric phase focal-conic state to said state having said given reflectivity by varying a duration of said sequence of addressing pulses.

57. The CLC display system as recited in claim 56 wherein said sequence of addressing pulses is preceded by a first sequence of pulses having an amplitude less than a minimum amplitude necessary to drive said CLC from the focal-conic state, a duration of said first sequence of pulses varied such that the sum of the duration of the first sequence of pulses and the duration of the sequence of addressing pulses has a constant value.

58. The CLC display system as recited in claim 54 wherein said first and second initialization signals are applied simultaneously to each of said plurality of controllable display elements.

59. The CLC display system as recited in claim 54 wherein said first and second initialization signals are applied to at least a first selected row of said plurality of controllable display elements, said first and second addressing signals being applied simultaneously therewith to at least a second selected row of said plurality of controllable display elements.

60. The CLC display system as recited in claim 54 wherein said first and second initialization signals and said first and second addressing signals comprise bipolar electrical waveforms.

* * * * *